(12) United States Patent
May et al.

(10) Patent No.: US 7,587,880 B2
(45) Date of Patent: Sep. 15, 2009

(54) SYSTEM FOR ENCLOSING A PRODUCT IN A COVERING MATERIAL

(75) Inventors: Dennis J. May, Pittsboro, NC (US);
Samuel D. Griggs, Raleigh, NC (US);
Matthew Lowder, Durham, NC (US)

(73) Assignee: Tipper Tie, Inc., Apex, NC (US)

( * ) Notice: Subject to any disclaimer, the term of this patent is extended or adjusted under 35 U.S.C. 154(b) by 0 days.

(21) Appl. No.: 11/951,076

(22) Filed: Dec. 5, 2007

(65) Prior Publication Data
US 2009/0145085 A1 Jun. 11, 2009

(51) Int. Cl.
*B65B 51/00* (2006.01)
(52) U.S. Cl. .......................... 53/417; 53/258; 53/138.2; 53/459; 53/567
(58) Field of Classification Search .................. 53/258, 53/417, 138.2–138.4, 459, 469, 567, 576, 53/526, 528, 530
See application file for complete search history.

(56) References Cited

U.S. PATENT DOCUMENTS

| | | | |
|---|---|---|---|
| 2,713,449 A | 7/1955 | Carmichael | |
| 3,389,533 A * | 6/1968 | Tipper et al. ............... | 53/134.1 |
| 3,499,259 A | 3/1970 | Tipper et al. | |
| 3,621,775 A * | 11/1971 | Dedio et al. .................. | 100/49 |
| 3,802,337 A * | 4/1974 | St-Hiliare ................. | 100/98 R |
| 3,815,323 A * | 6/1974 | Longo ........................... | 53/530 |
| 4,683,700 A | 8/1987 | Evans et al. | |
| 4,766,713 A | 8/1988 | Evans | |
| 5,009,058 A | 4/1991 | Ptaschek et al. | |
| 5,161,347 A | 11/1992 | May et al. | |
| 5,495,701 A | 3/1996 | Poteat et al. | |
| 5,586,424 A | 12/1996 | Chen et al. | |
| 5,657,527 A * | 8/1997 | Houck et al. .................. | 29/429 |
| 5,687,551 A * | 11/1997 | Mustain et al. ............... | 53/468 |
| 5,987,858 A * | 11/1999 | Long ........................... | 53/529 |
| 6,125,615 A | 10/2000 | Germunson et al. | |
| 2004/0250512 A1 | 12/2004 | May et al. | |
| 2005/0016130 A1 * | 1/2005 | Matsumoto .................. | 53/439 |
| 2005/0039419 A1 | 2/2005 | Griggs et al. | |
| 2005/0284108 A1 | 12/2005 | Griggs et al. | |

FOREIGN PATENT DOCUMENTS

| | | |
|---|---|---|
| DE | 3110215 A1 | 9/1982 |
| EP | 0425445 A | 5/1991 |
| FR | 2213877 | 8/1974 |

* cited by examiner

*Primary Examiner*—Hemant M Desai
(74) *Attorney, Agent, or Firm*—Myers Bigel Sibley & Sajovec, PA

(57) ABSTRACT

A system for enclosing a target product in a covering material includes an elongate product chute, an elongate breech-loader chute and a receiving station. The elongate product chute has opposing ingress and egress end portions with an interior cavity extending therethrough. The breech-loader chute has a primary chute body with opposing ingress and egress end portions residing above and upstream of the product chute in cooperating alignment therewith. The primary chute body slopes downwardly in a direction of product travel. The receiving station is disposed below the breech-loader chute and includes a receiver floor that receives the target product from the breech-loader chute. The receiver floor is selectively movable between an extended receiving position and a retracted staging position to thereby support and move the target product for delivery to the product chute.

17 Claims, 21 Drawing Sheets

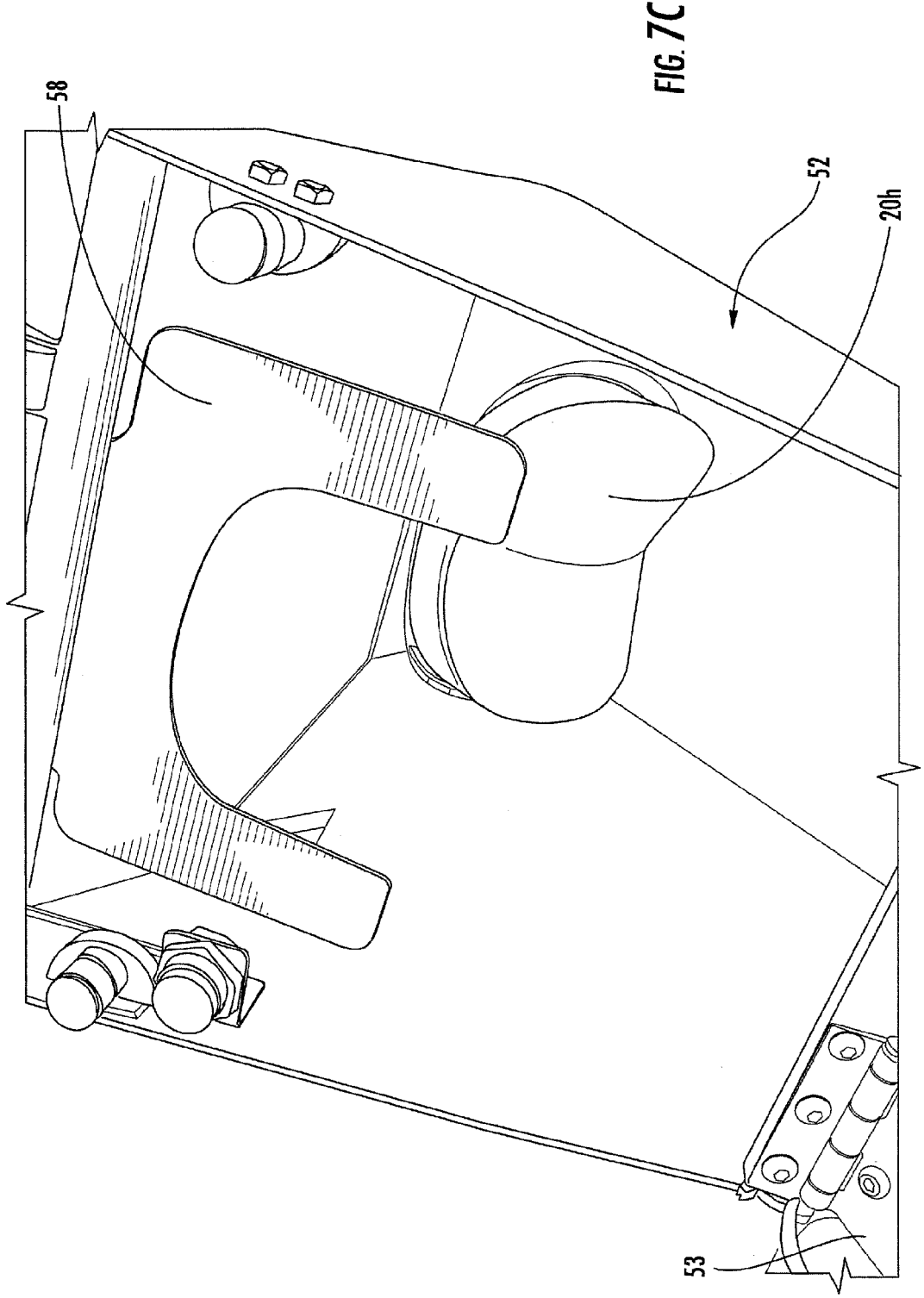

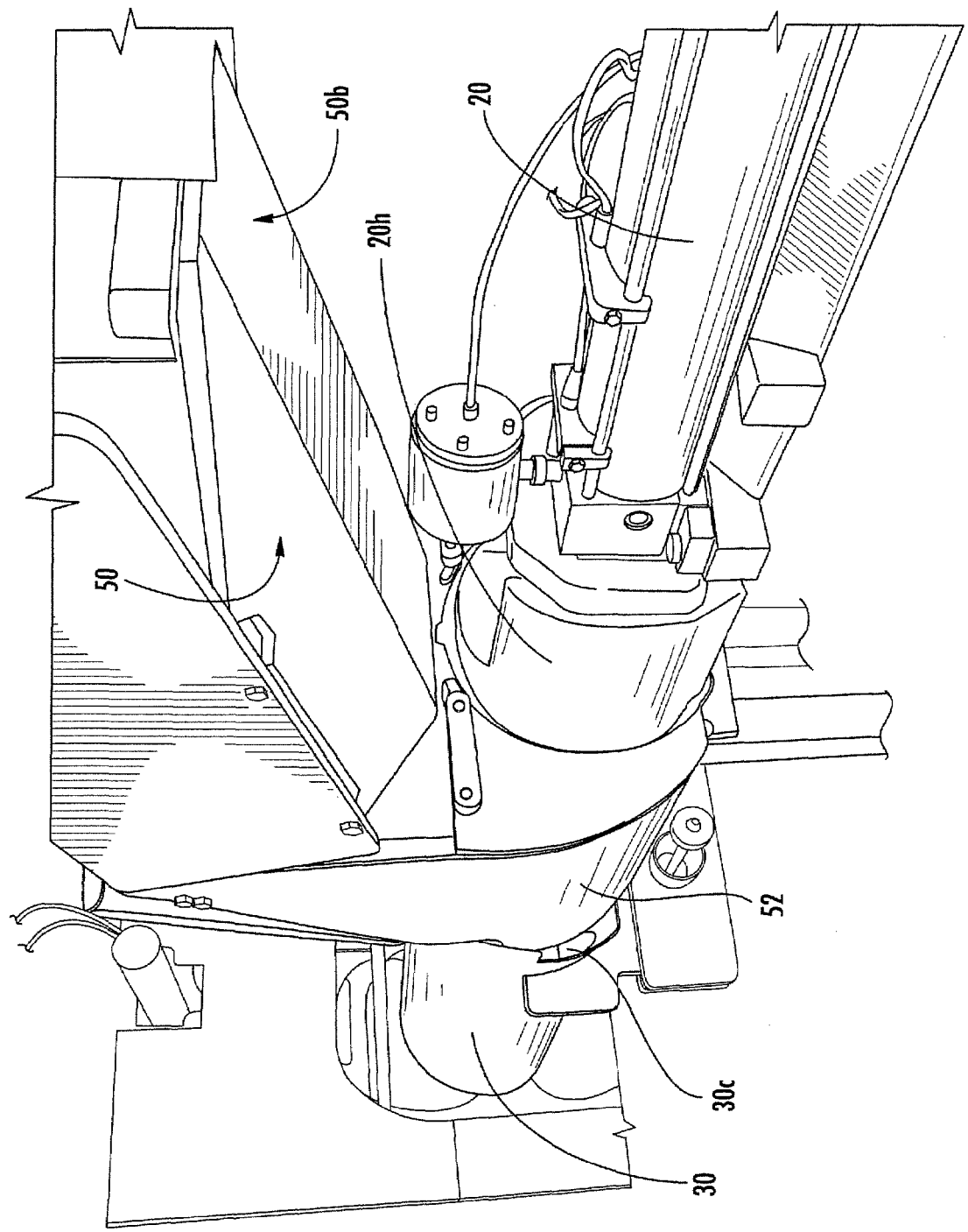

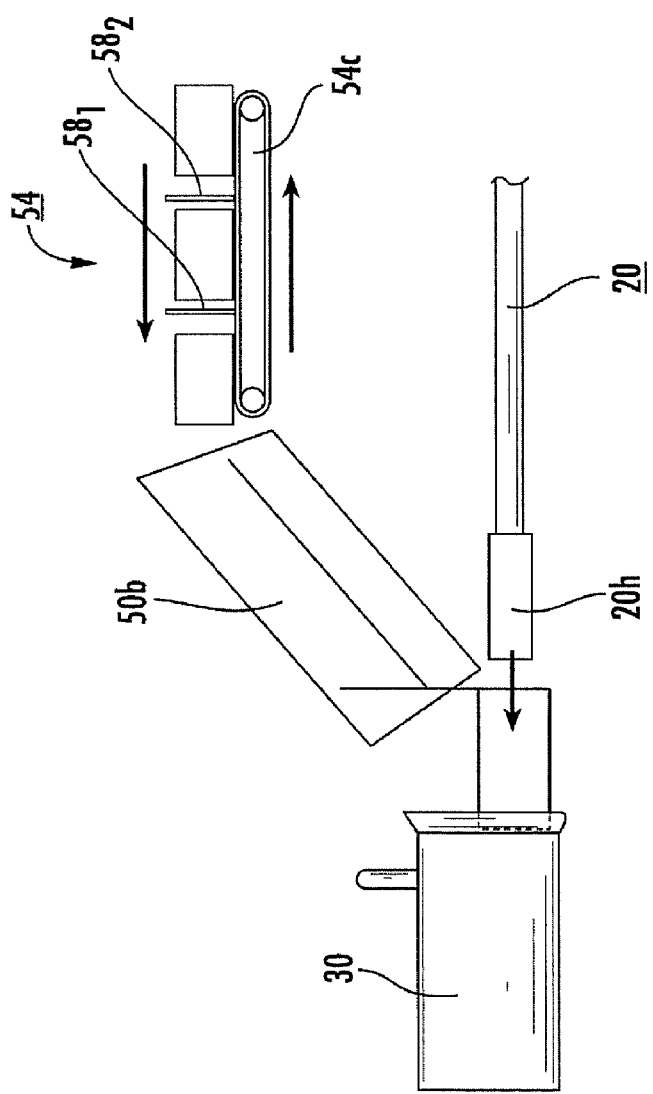
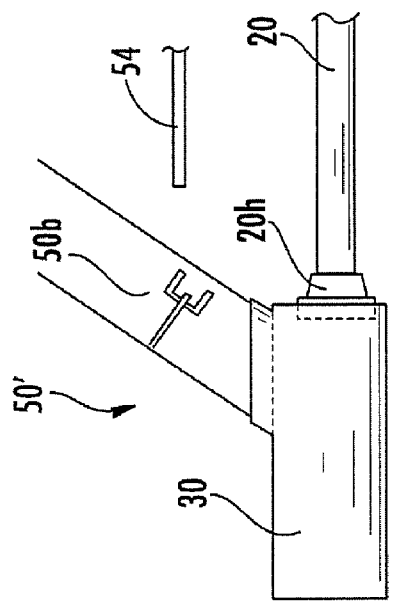
FIG. 9A
FIG. 9B

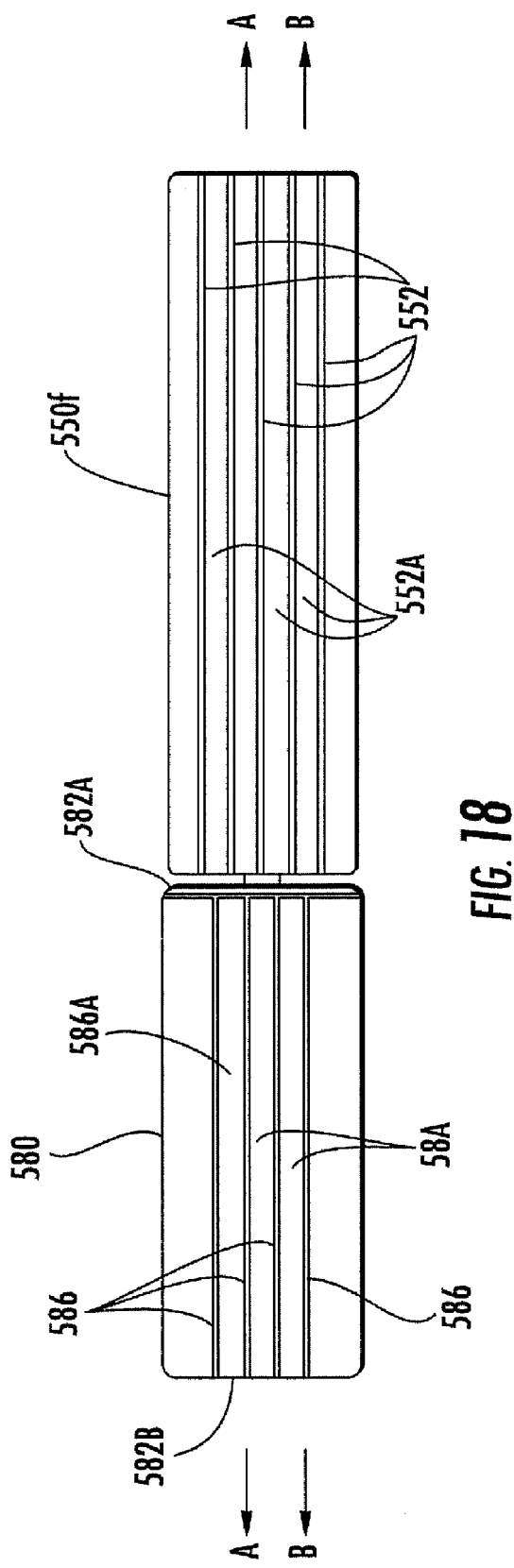
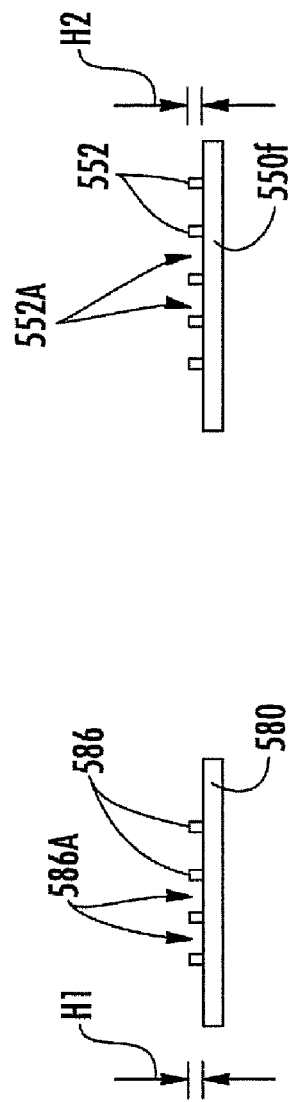
FIG. 18
FIG. 19
FIG. 20

SYSTEM FOR ENCLOSING A PRODUCT IN A COVERING MATERIAL

FIELD OF THE INVENTION

The present invention relates to apparatus that can package and apply closure clips to materials that enclose products therein, and may be particularly suitable for enclosing and clipping the products in netting material.

BACKGROUND OF THE INVENTION

Certain types of commodity and/or industrial items can be packaged by placing the desired product(s) in a covering material and then applying a closure clip or clips to end portions of the covering material to secure the product(s) therein. For non-flowable piece goods, the piece goods can be held individually in a respective clipped package, or as a group of goods in a single package. The covering material can be any suitable material, typically a casing and/or netting material.

Generally described, when packaging a piece good product in netting, the product is manually pushed through a netting chute. The product can include, by way of example, a non-flowable semi-solid and/or solid object such as a meat product including whole or half hams, turkey, chicken, and the like. The netting chute holds a length of a netting sleeve over the exterior thereof. A first downstream end portion of the netting is typically closed using a first clip. As the product exits the netting chute, it is covered with the netting. An operator can then orient the product inside the netting between the discharge end of the chute and the clipped first end portion of the netting. The operator can then pull the netting so that the netting is held relatively tight (typically stretched or in tension) over the product. The operator then uses his/her hands to compress or gather the open end of the netting (upstream of the product) and then manually applies a clip to the netting, typically using a Tipper Tie® double clipper apparatus. A clip attachment apparatus or "clippers" are well known to those of skill in the art and include those available from Tipper Tie, Inc., of Apex, N.C., including product numbers Z3214, Z3202, and Z3200. Examples of clip attachment apparatus and/or packaging apparatus are described in U.S. Pat. Nos. 3,389,533; 3,499,259; 4,683,700; 5,161,347, and co-pending U.S. patent application Ser. No. 10/951,578 (Pub. No. US-2005-0039419-A1), the contents of which are hereby incorporated by reference as if recited in full herein.

The double clipper concurrently applies two clips to the netting proximate the open (upstream) end of the package. One clip defines the first end portion of the next package and the other defines the trailing or second end portion of the package then being closed. A cutting mechanism incorporated in the clipper apparatus can sever the two packages before the enclosed package is removed from the clipper apparatus. U.S. Pat. No. 4,766,713 describes a double clipper apparatus used to apply two clips to a casing covering. U.S. Pat. No. 5,495,701 proposes a clipper with a clip attachment mechanism configured to selectively fasten a single clip or two clips simultaneously. The mechanism has two punches, one of which is driven directly by a pneumatic cylinder and the other of which is connected to the first punch using a pin and key assembly. The pin and key assembly allows the punches to be coupled or decoupled to the pneumatic cylinder drive to apply one single clip or two clips simultaneously. U.S. Pat. No. 5,586,424 proposes an apparatus for movement of U-shaped clips along a rail. The apparatus includes a clip feed for advancing clips on a guide rail and the arm is reciprocally driven by a piston and cylinder arrangement. The contents of each of these patents are hereby incorporated by reference as if recited in full herein.

SUMMARY OF EMBODIMENTS OF THE INVENTION

According to embodiments of the present invention, a system for enclosing a target product in a covering material includes an elongate product chute, an elongate breech-loader chute and a receiving station. The elongate product chute has opposing ingress and egress end portions with an interior cavity extending therethrough. The breech-loader chute has a primary chute body with opposing ingress and egress end portions residing above and upstream of the product chute in cooperating alignment therewith. The primary chute body slopes downwardly in a direction of product travel. The receiving station is disposed below the breech-loader chute and includes a receiver floor that receives the target product from the breech-loader chute. The receiver floor is selectively movable between an extended receiving position and a retracted staging position to thereby support and move the target product for delivery to the product chute.

According to method embodiments of the present invention, a method of successively loading target products into a packaging apparatus includes: releasing a target product from an elongate breech-loader chute having a primary chute body with opposing ingress and egress end portions, the primary chute body sloping downwardly in a direction of product travel; advancing the target product to a receiver floor downstream of the breech-loader chute; moving the receiver floor with the target product thereon to reposition the target product for delivery to an elongate product chute having opposing ingress and egress end portions with an interior cavity extending therethrough; advancing the target product from the receiver floor into and through the interior cavity of the product chute; and packaging the target product in covering material held on the product chute as the target product exits the product chute.

According to embodiments of the present invention, a computer program product for operating an automated or semi-automated packaging apparatus with a netting chute to package a target product includes a computer readable storage medium having computer readable program code embodied in said medium. The computer-readable program code includes computer readable program code that communicates with control sensors and directs a floor drive mechanism to automatically and controllably move a receiver floor between a receiving position, wherein the receiver floor is positioned adjacent a breech-loader chute floor, and a staging position, wherein the receiver floor is spaced apart from the breech-loader chute floor and positioned to place the target product into a product travel path associated with a product chute.

These and other objects and/or aspects of the present invention are explained in detail in the specification set forth below.

BRIEF DESCRIPTION OF THE DRAWINGS

FIG. 7C is a perspective view of the breech-loader chute shown in FIG. 7B with the stop member pivoted outward to provide the product release position according to embodiments of the present invention.

FIG. 8 is a side perspective view of the device shown in FIG. 3 illustrating an upstream portion of an underside of the breech-loader according to embodiments of the present invention.

FIG. 9A is a schematic illustration of an alternate staging platform according to embodiments of the present invention.

FIG. 9B is a schematic illustration of an alternate breech-loader configuration according to other embodiments of the present invention.

FIG. 18 is a top plan view of the receiver floor and a breech-loader chute floor of the automatic clipping packaging apparatus of FIG. 14 wherein the receiver floor is in the receiving position.

FIG. 19 is an end elevational view of the receiver floor of the automatic clipping packaging apparatus of FIG. 14.

FIG. 20 is an end elevational view of the breech-loader chute floor of the automatic clipping packaging apparatus of FIG. 14.

DESCRIPTION OF EMBODIMENTS OF THE INVENTION

Figure 1:
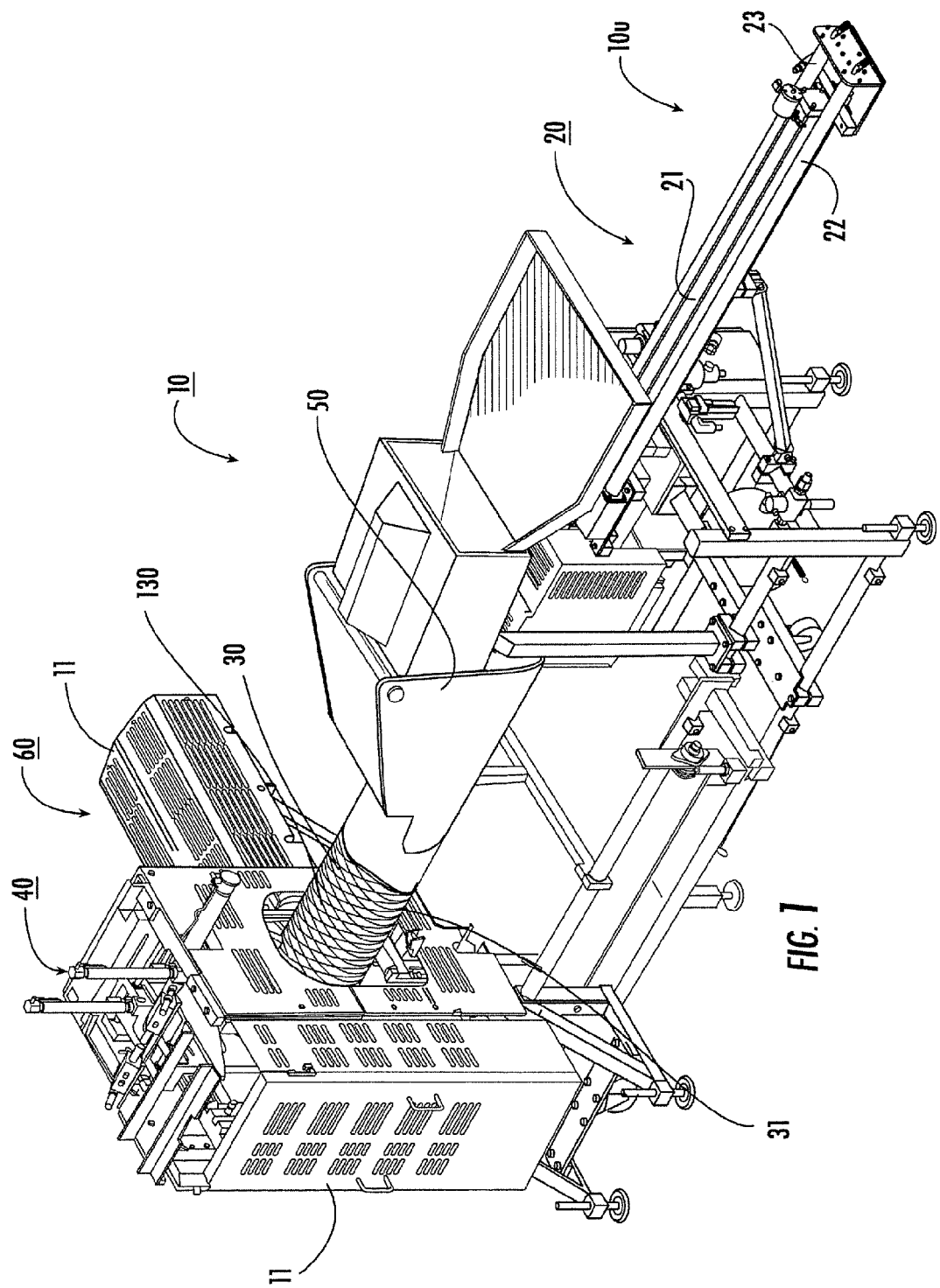
FIG. 1 is a perspective view of an apparatus/system used to advance objects through a product chute, and then automatically apply a clip(s) via a clipper mechanism according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations, unless specified otherwise. In addition, the sequence of operations (or steps) is not limited to the order presented in the claims unless specifically indicated otherwise. Where used, the terms "attached", "connected", "contacting", "coupling" and the like, can mean either directly or indirectly, unless stated otherwise. The term "concurrently" means that the operations are carried out substantially simultaneously.

In the description of the present invention that follows, certain terms are employed to refer to the positional relationship of certain structures relative to other structures. As used herein, the term "front" or "forward" and derivatives thereof refer to the general or primary direction that the clips travel toward a target product for closure and/or the direction that the target filled or stuffed product in casing material travel; this term is intended to be synonymous with the term "downstream," which is often used in manufacturing or material flow environments to indicate that certain material traveling or being acted upon is farther along in that process than other material. Conversely, the terms "rearward" and "upstream" and derivatives thereof refer to the directions opposite, respectively, the forward and downstream directions.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terms "breech-loader" and "breech-loading" refers to a loading configuration that is generally above (overhead) and rearward of at least a major portion of an elongate product (typically netting) chute. The term "frame" means a generally skeletal structure used to support one or more assemblies, modules and/or components. The term "modular" means that a subassembly is designed with standardized dimensions, mounting features and/or configurations for interchangeable use with replacement modules of the same or similar type and/or other selected different modules. The frame and selected modules of certain embodiments may also be configured for selectable mounting of operative components on a right or left hand side of a common frame.

The present invention is particularly suitable for applying closure clips to discrete objects held in a covering material. The covering material may be natural or synthetic and may be a casing material that can be sealed about a product or may be netting. The casing can be any suitable casing (edible or inedible, natural or synthetic) such as, but not limited to, collagen, cellulose, plastic, elastomeric or polymeric casing. The term "netting" refers to any open mesh material formed by any means including, for example, knotted, braided, extruded, stamped, knitted, woven or otherwise. Typically, the netting is configured so as to be stretchable in both axial and lateral directions, but fixed diameter netting or covering may also be used.

Netting or other covering material may be used to package discrete meat products such as loaves of meat, boned ham, spiral sliced ham, deboned ham, turkey, turkey loaves held in molds, or other meat or items, directly or with the items held in subcontainers and/or wraps such as molds, trays, boxes, bags, absorbent or protective sheets, sealant, cans and the like. Other embodiments of the present invention may be directed to package other types of food such as cheese, bread, fruit, vegetables, and the like. Examples of non-food items that may be packaged using embodiments of the present invention include living items such as flora, trees, and the like, as well as inanimate objects. Additional examples of products include discrete, semi-solid or solid non-flowable objects such as firewood, pet food (typically held in a container if the wet type), recreational objects (such as toy or game balls), or other solid or semi-solid objects. The product may be packaged for any suitable industry including horticulture, aquaculture, agriculture, or other food industry, environmental, chemical, explosive, or other application. Netting may be particularly useful to package ham or turkeys, manufactured hardware such as automotive parts, firewood, explosives, molded products, and other industrial, consumable, and/or commodity items.

Embodiments of the present invention may be particularly suitable for large meat products, such as meat products weighing over 20 pounds, typically about 35-40 pounds. In some embodiments, the system can be automated sufficiently to output at least about 12 large objects per minute.

Generally stated, embodiments of the present invention are directed at automating packaging of piece goods or discrete items by introducing, then forcing, them through a product chute and wrapping or enveloping the objects at the other end of the product chute in a covering material, such as netting. In some embodiments, after the product(s) is enclosed in the packaging, a clip(s) or other attachment means can be automatically or semi-automatically applied to the covering material to thereby close a leading and/or trailing edge of the covering and hold the object or objects inside of the covering material. As noted above, clippers are available from Tipper Tie, Inc., of Apex, N.C. Examples of suitable clips include metallic generally "U"-shaped clips available from Tipper Tie, Inc., in Apex, N.C. Other clips, clip materials and clip configurations or closure means may also be used.

FIG. 1 illustrates an exemplary automatic clipping packaging apparatus 10 according to embodiments of the present invention. As shown, the apparatus 10 includes a product pusher assembly mechanism 20, a product chute 30, and a clipper 40. It is noted that the clipper 40 may be referred to herein as a clipper apparatus, clipper module, clipper mechanism, and/or clipper assembly, but each term may be used interchangeably with the others. For a more complete discussion of the pusher mechanism and certain clipper operations and devices, see co-pending, co-assigned U.S. patent application Ser. Nos. 10/952,421 and 10/951,578, the contents of which are hereby incorporated by reference as if recited in full herein.

As shown, the apparatus 10 includes a breech-loader chute 50 that is used to introduce target objects into the primary product travel or flow path. Optionally, the apparatus 10 may also include a handle maker 60 as is known to those of skill in the art. FIG. 1 illustrates the apparatus 10 with examples of housing guards 11 disposed over certain functional components.

In the embodiment shown, the apparatus 10 can be described as a horizontal automatic clipping packaging apparatus as the product is generally moved, processed, clipped and packaged in a horizontal plane. However, certain components, features or operations may be oriented and/or carried out in other planes or directions and the present invention is not limited thereto. For example, the product chute 30 and/or the breech-loader chute 50 may be configured to incline. As shown in FIGS. 1-4, typically at least a portion of the breech-loader chute 50 will be angularly disposed to allow for a gravity-fed or gravity-assisted introduction of target objects into the flow path downstream of the pusher head 20h (FIG. 5) as will be discussed further below.

Figure 2:
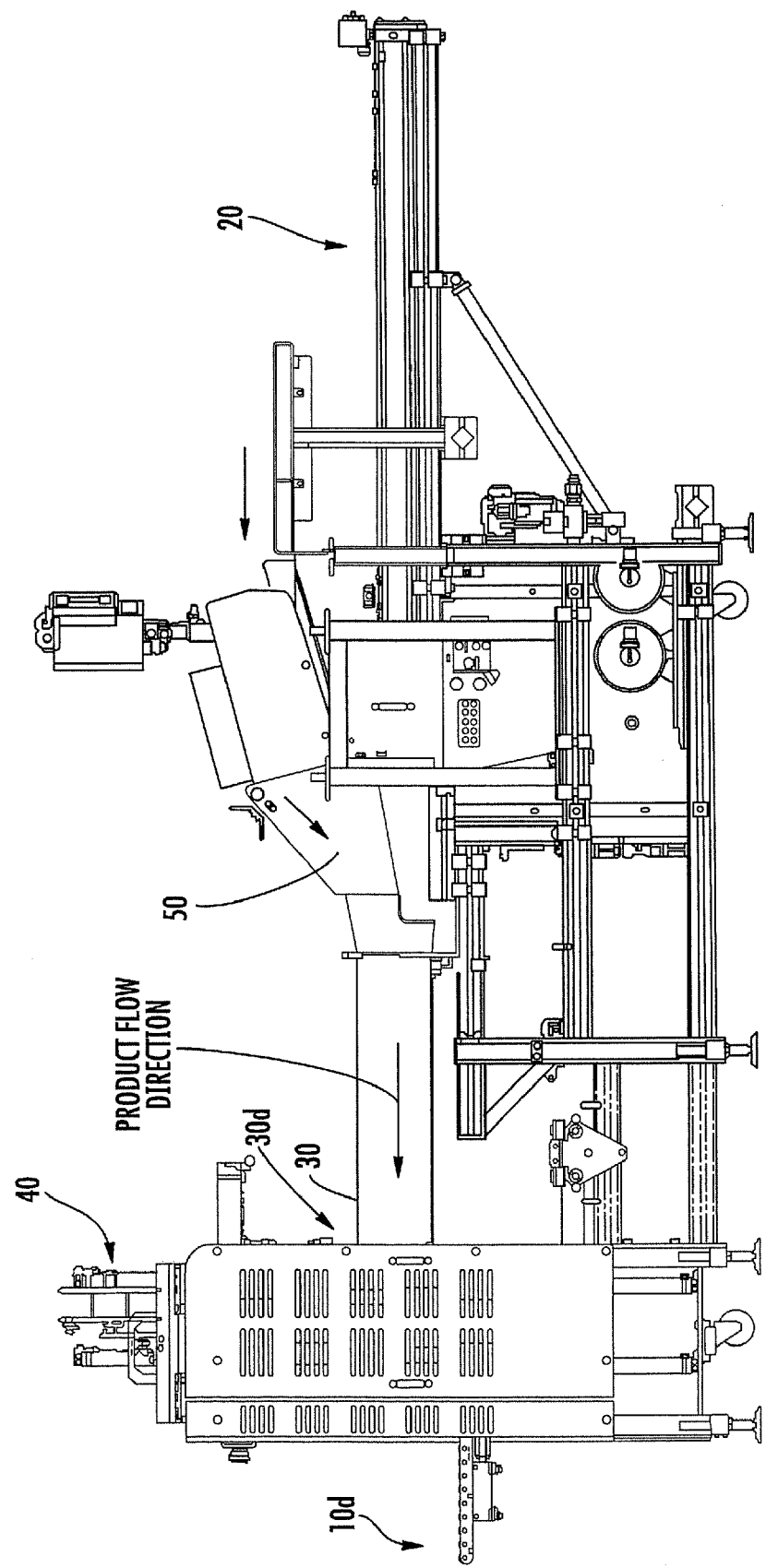
FIG. 2 is a side view of the device shown in FIG. 1 illustrating the direction of travel.

The arrow in FIG. 2 indicates the primary direction of product travel or flow, which is toward the product chute 30 and clipper 40. The term "flow" is used descriptively to indicate travel rather than a fluid object. In addition, although the downstream direction 10d is shown as in a direction that extends from right to left (with the upstream direction 10u) in the opposing direction, the apparatus 10 can be oriented to run left to right or in a direction that is in or out of the paper.

Figure 3:
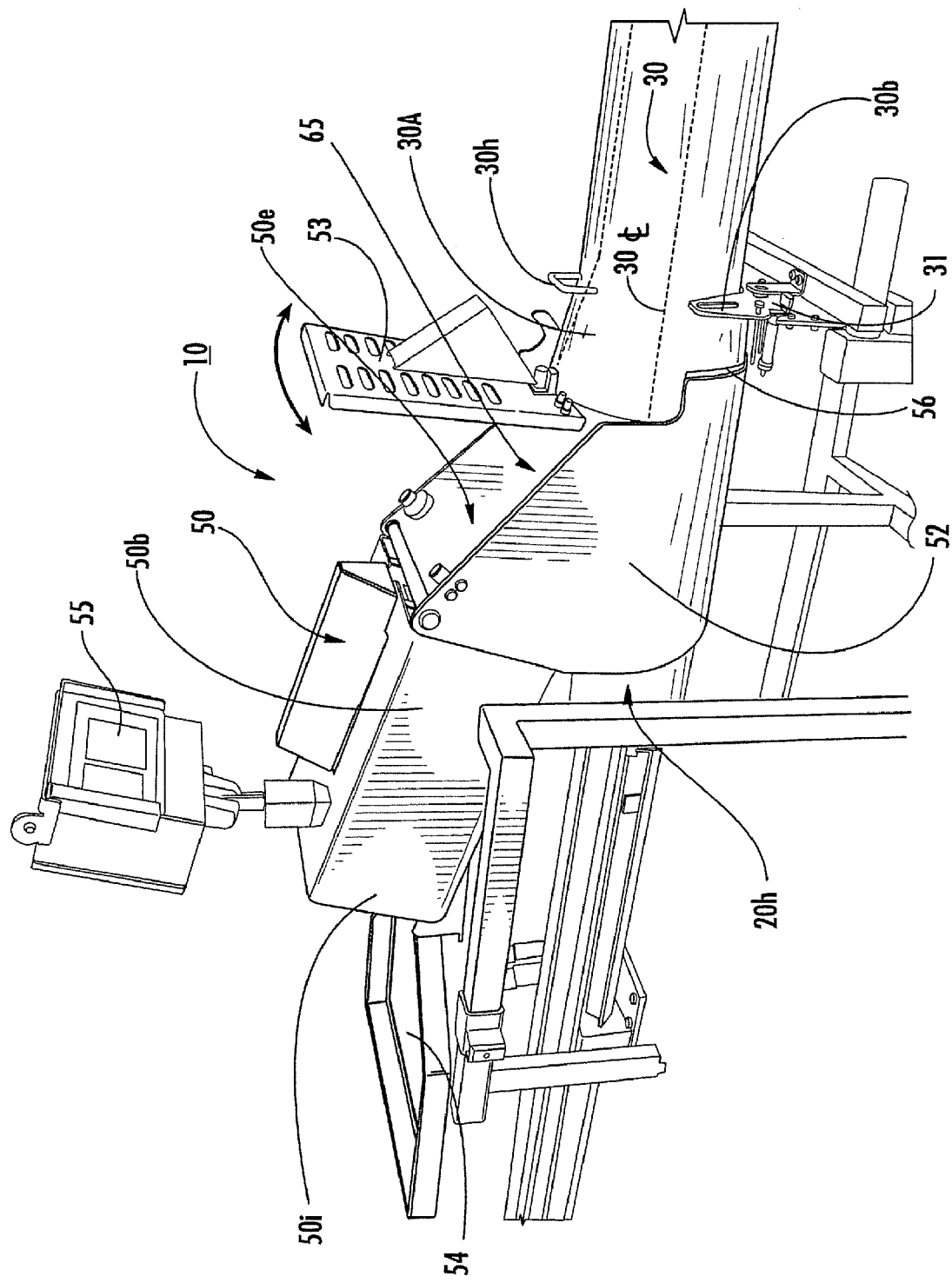
FIG. 3 is a side perspective view of a breech-loader chute according to embodiments of the present invention.

FIG. 3 illustrates a human machine interface ("HMI") station 55 that houses operational switches or components that an operator can access to operate the apparatus 10. The apparatus 10 includes a product transfer zone 65, which is the location where a product (or products) is positioned after discharge from the breech loading cute body 50b. In some embodiments, as shown in FIG. 3, the location of the zone 65 is typically intermediate the product pusher assembly 20 (in the retracted "home" position or when retracted a sufficient distance) and the product chute 30, and substantially aligned with the internal cavity 30c (FIG. 7B) of the product chute 30. This positioning of the product in the flow path and/or alignment with the product chute cavity 30c can be carried out substantially automatically as will be discussed further below. The target product undergoing packaging can be manually introduced or placed into the breech-loader chute 50 or can be introduced by an automated staging station 54 (FIG. 9A).

Figure 4:
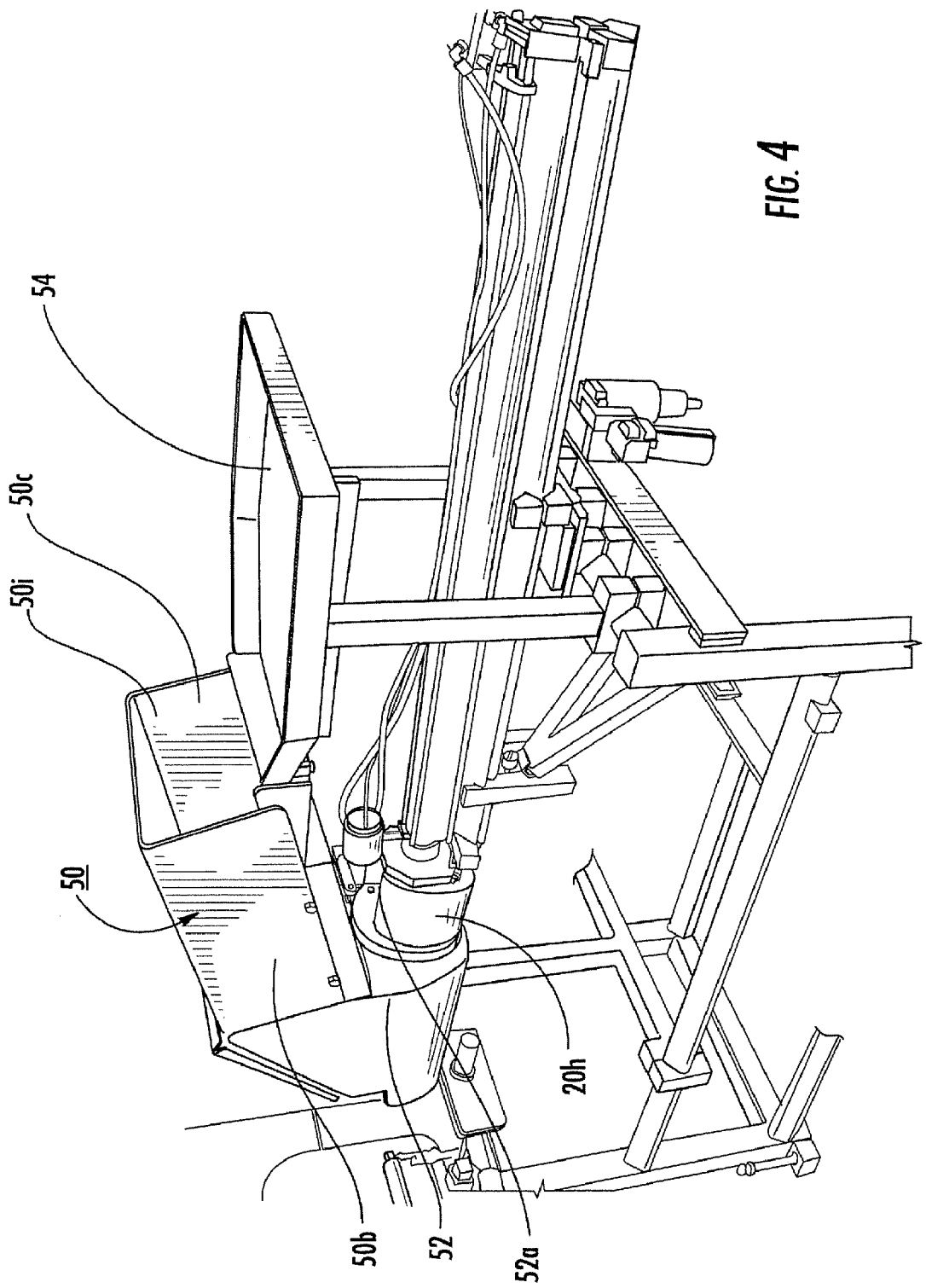
FIG. 4 is an opposing side perspective view of the device shown in FIG. 3 according to embodiments of the present invention.

FIGS. 3 and 4 illustrate an exemplary breech-loader chute 50 that feeds target objects or product into the product chute 30 either directly or indirectly (the latter being shown). As also shown, the breech-loader chute 50 can comprise an elongate chute primary body 50b that extends generally above and at least partially rearward of the product chute 30. As shown, the breech-loader chute primary body 50b has opposing ingress and egress portions 50i, 50e, respectively, and the primary body 50b angles downwardly from a staging platform 54 to merge into a receiving member 52. The receiving member 52 can be axially aligned with the product chute 30. That is, the receiving member 52 and the product chute 30 can have a substantially common axially extending centerline 30cl. The receiving member 52 and the product chute 30 are each shown as being mounted in a generally horizontal orientation to provide a generally horizontal product travel path.

In operation, in some embodiments, a target object(s) or product(s) can be placed on the staging platform 54. The object or product can then travel through the breech-loader chute cavity 50c (FIG. 4). The objects can serially (or if a set of discrete objects are packaged together, concurrently) slide, and/or are pushed or conveyed down at least a portion of the primary body 50b of the breech-loader chute, then automatically (typically controllably) dropped from the primary body 50b of the breech-loader chute. Combinations of different movement means can also be employed. Typically, the target objects travel via gravity-assistance to slide through the primary chute body 50b. After exiting the primary body 50b, the object(s) are caught by the receiving member 52 and automatically (without requiring manual adjustment) axially aligned in position downstream of the product pusher head 20h. The receiving member 52 can include a moveable ceiling 53 to allow an operator service access. Typically, an electromechanical system interlock can be used to inhibit or prevent operation of the pusher assembly 20 while the ceiling 53 is open.

In some embodiments, the product is dropped intermediate the product pusher head 20h (with the head 20h retracted upstream of the egress portion 50e of the chute body 50b) and the product chute 30, and ready to be pushed into the internal cavity 30c (FIGS. 7B, 8) of the product chute 30. This positioning of the product in the flow path and/or alignment with the product chute cavity 30c can be carried out substantially automatically as will be discussed further below.

Figure 7A:
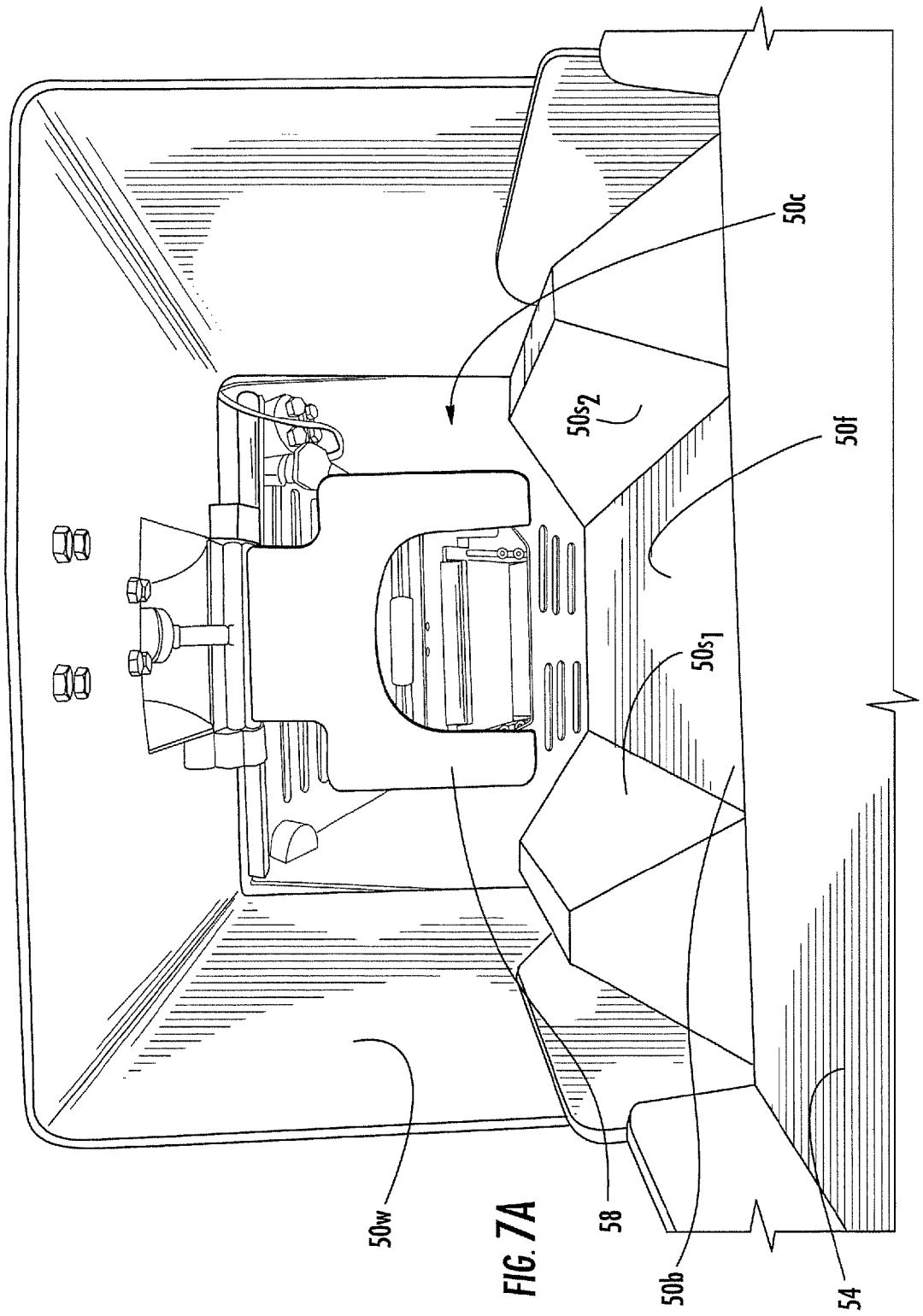
FIG. 7A is an end view of the breech-loader chute shown in FIG. 3 with a product stop member disposed in the travel channel according to embodiments of the present invention.

FIGS. 5-7C illustrate that the breech-loader chute 50 can include at least one stop member 58 that can electronically (automatically or semi-automatically) controllably stop (hold), then release, a target object(s) from the chute body 50b. FIG. 7B illustrates that the stop member 58 can be in communication with an (pneumatic) actuator 58a. FIG. 7A illustrates the stop member 58 in a hold position while FIGS. 7B and 7C illustrate the stop member 58 pivoted upwardly in a release position. The stop member 58 is shown as pivoting from a pivot 58p at a top egress portion of the chute body 50b. However, a stop member 58 can be configured in a number of different ways, such as to rise from the floor and/or close from the sides. Placing the only or last stop member 58 close to the egress portion of the chute 50e can allow for a faster discharge into the receiving member 52 once the pusher head 20h is retracted (where pusher mechanisms such as the one shown in the figures are used).

In addition, in some embodiments, a stop member 58 can be positioned at the staging platform 54 or in an ingress portion of the chute 50i. FIG. 9A illustrates that the staging platform 54 can include a conveyor 54c and/or other translatable floor that cooperate with stop members $58_1$, $58_2$ that can be used to control the release of objects into the breech-loader chute 50. FIG. 9B illustrates that a stop member 58 can be located generally medially in the primary body 50b.

In any event, the at least one stop member 58 can be configured to release a target object from the egress portion of the chute 50e when the pusher head 20h is retracted and/or in a home position. To do so, a proximity switch and/or timer (typically associated with a duration of the pusher cycle) can be used to provide the input signal to electronically control the automated actuation of the release and hold cycle and/or conveyor 54c action (FIG. 9A).

In some embodiments, the receiving member 52 has a cross-sectional width that is less than that of the product chute 30. In particular embodiments, the receiving member can have a cross-sectional width that is about 1.0-0.25 inches less than that of the product chute 30, typically about 0.5 inches. The breech-loader chute 50 can be configured to cooperate with a plurality of differently configured and/or sized product chutes 30 to be interchangeably used with the breech-loader 50. At least some of the product chutes 30 can be configured for manual or conventional gravity feed systems not requiring the use of pusher mechanisms 20. Typically the interchangeable chutes 30 will be mounted to provide a substantially similar axial center-line. As shown, in some embodiments, the forwardmost lower edge portion of the receiving member 52 can be spaced apart from the rearwardmost bottom portion of the product chute 30 with a small gap 56 extending therebetween. In other embodiments, the receiving member 52 can be sized and configured to enter (nest in) a receiving cavity in the product chute (not shown). In still other embodiments, the receiving member 52 can be configured and sized to receive a portion of the product chute 30 (not shown).

In some embodiments, the receiving member 52 can be attached to or integrated with the primary body 50b of the breech-loader chute 50 as shown. In other embodiments, the receiving member 52 can be a discrete member that is configured to cooperate with the primary body 50b of the breech-loader chute.

In some embodiments, the breech-loader chute 50 and the product chute 30 can be sized and configured to allow the breech-loader body 50b to directly discharge product or objects through an opening in a ceiling of the product chute 30 (FIG. 9B) downstream of the pusher head 20h. In this embodiment, the product chute 30 can define the receiving member 52. The breech-loader chute body 50b can include a support bracket that matably attaches to the chute 30 or the chute 30 can include a flange, bracket or other attachment means that can hold the breech-loader chute 50 in alignment with sufficient structural rigidity. The breech-loader chute 50 can be releasably attached to allow for removal and cleaning and/or use with a plurality of different chutes 30.

Figure 5:
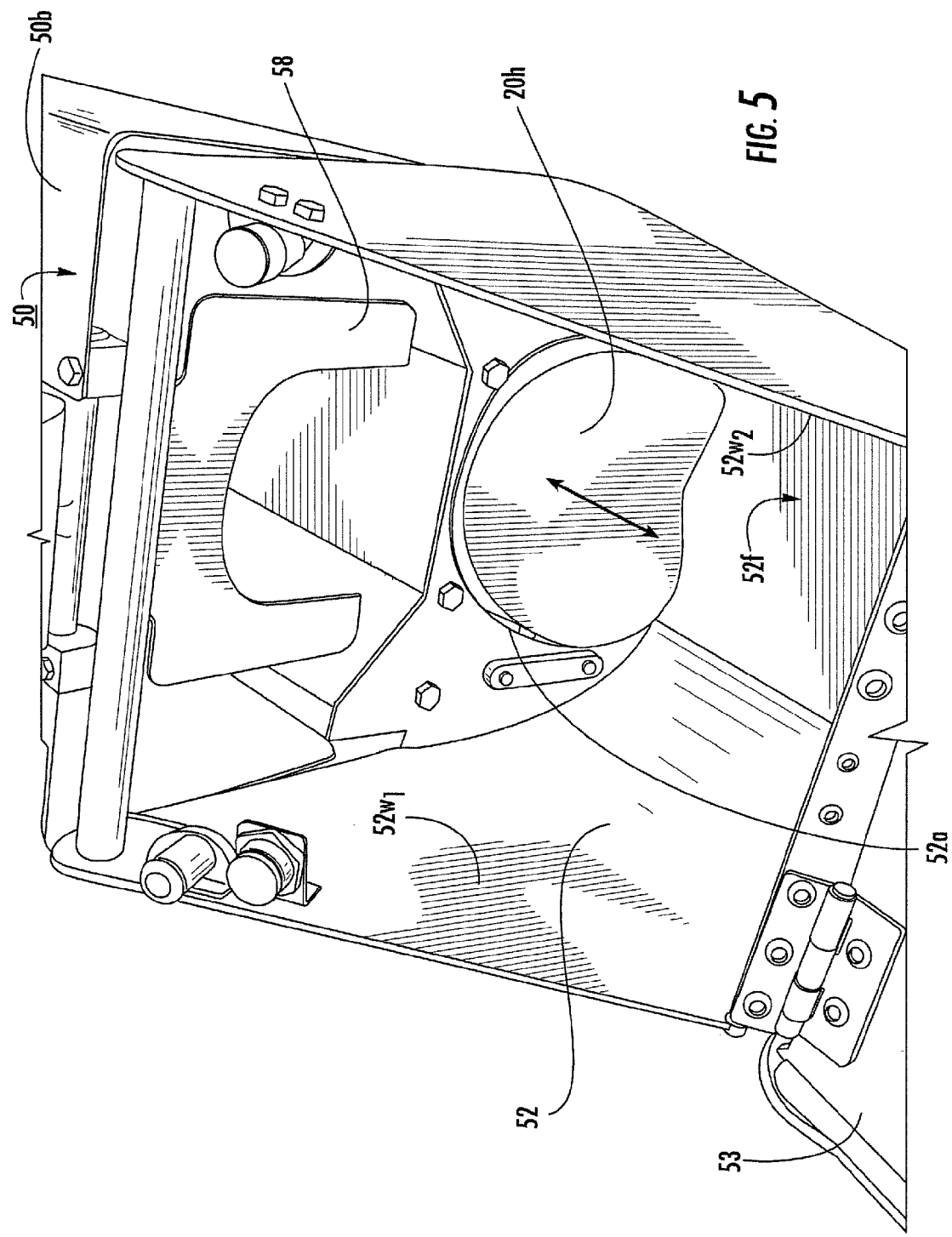
FIG. 5 is a top perspective view of an egress portion of the breech-loader device shown in FIG. 3 according to embodiments of the present invention.
Figure 6:
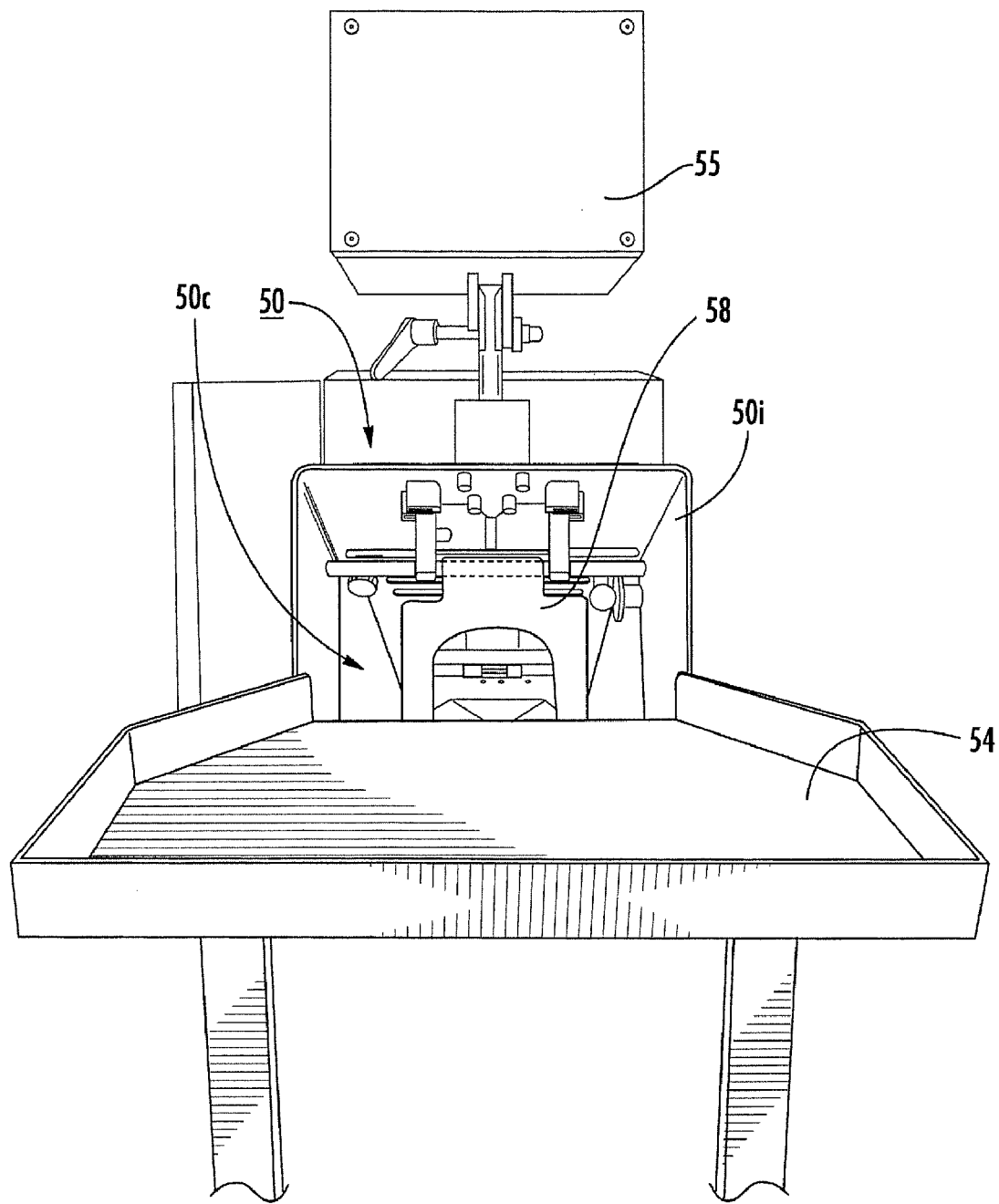
FIG. 6 is an axial view (looking downstream) of the device shown in FIG. 3 according to embodiments of the present invention.

In operation, the product pusher assembly 20 linearly retracts and advances to push a product through the product chute 30 so that the product is positioned proximate the clipper 40, then retracts to a resting state in a home position upstream of a product transfer zone. As shown in FIGS. 4 and 5, the receiving member 52 can include a pusher aperture 52a that allows the pusher head 20h to travel reciprocally into and out of the chute body 30. FIG. 5 illustrates an exemplary home or retracted position of the pusher head 20h whereby a target object can be released to drop or fall in front of the pusher head 20h, and captured in the receiving member 52 with the target object(s) residing on the floor 52f of the receiving member. In the embodiment shown, the target object can be captured and relatively snugly held in an axially aligned configuration by the upwardly extending walls $52w_1$, $52w_2$ and the floor 52f of the receiving member 52. The ceiling 53 (FIG. 3) can be configured so as not to contact the contained underlying object(s).

Figure 7B:
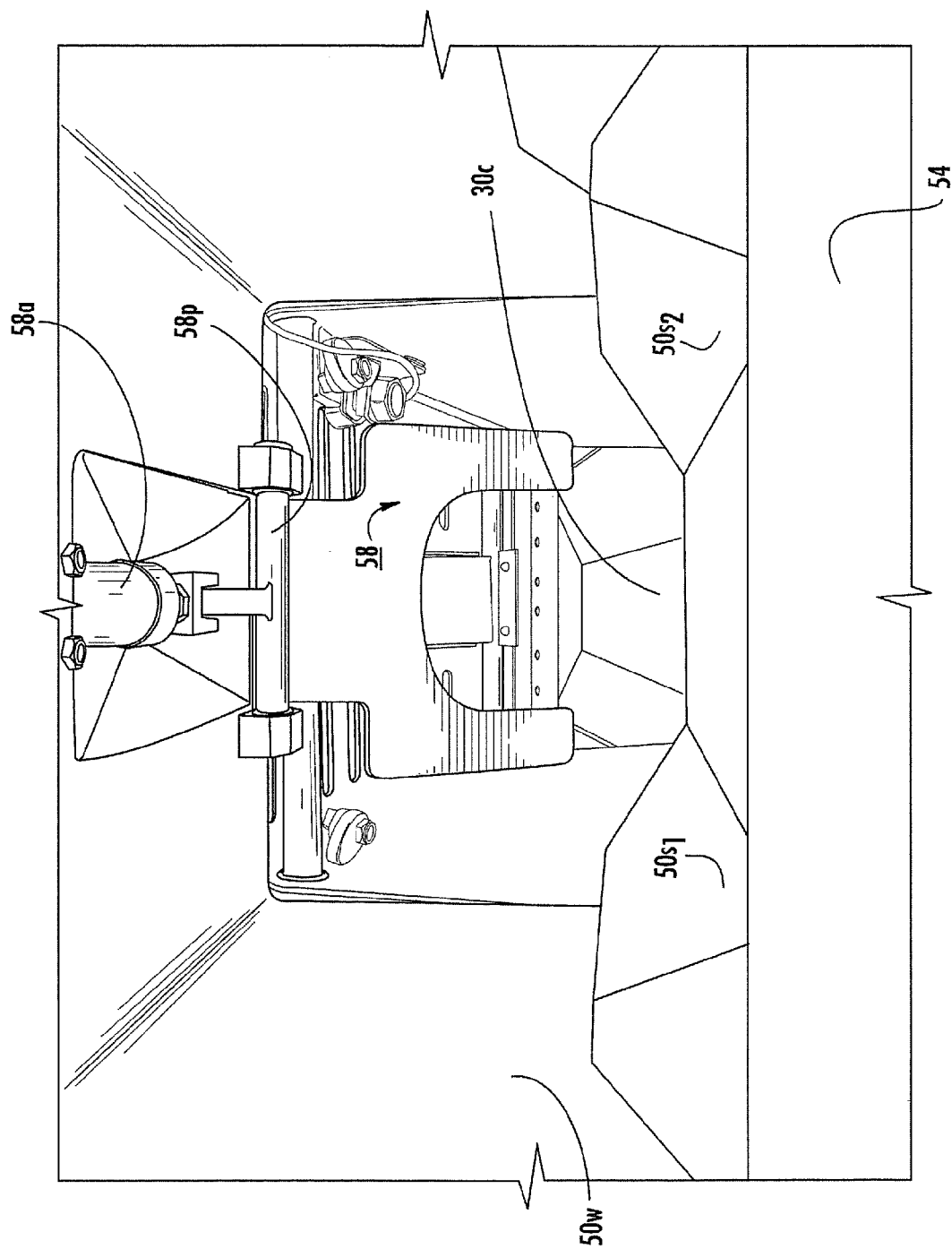
FIG. 7B is an end view of the breech-loader chute shown in FIG. 7A with the product stop member in a product release position according to embodiments of the present invention.

FIGS. 7A and 7B illustrate one embodiment of the internal cavity 50c of the breech-loader primary chute body 50b. As shown, the floor 50f includes a center channel and two upwardly extending sidewalls $50s_1$, $50s_2$ that are spaced apart from the outer wall 50w. The target object(s) resides between the sidewalls $50s_1$, $50s_2$ supported by the floor 50f and typically does not contact the outer wall 50w. The breech-loader chute cavity 50c can provide a continuous transition to the primary travel path, with three sides (the floor and the sidewalls) configured to hold or contain the target objects.

FIG. 8 illustrates the product chute 30 in position and FIG. 7C illustrates that the axial center-line of the primary body of the breech-loader 50b is substantially centered and above that of the product chute 30.

In operation, as described above, a sleeve of covering material 31 can be positioned about the external surface of the product chute 30 and configured to be drawn downstream thereof so as to automatically encase the product as the product emerges from the discharge end 30d (FIG. 2) of the product chute 30. A supplemental sleeve material holder may also be used if desired instead of placing the sleeve of casing material on the product chute. The supplemental sleeve holder can be configured to surround a downstream portion of the product chute (not shown). The sleeve of covering material may be sized to stretch to substantially conform to the external wall or surface of the product chute 30 or may be more loosely held thereon, and/or may be a fixed diameter open weave material. The cavity of the product chute 30c may be sized to snugly contact or squeeze opposing portions of the product (side to side and/or top to bottom) as the product is pushed therethrough or may be oversized with respect to the product so that the product loosely travels therethrough.

In operation, the sleeve of covering material may be clipped, welded, fused, knotted or otherwise closed at a leading edge portion thereof. When the product exits the product chute 30, it is held in the covering material as the covering material is drawn downstream. Another clip can be applied to a trailing edge of the material as the product exits the chute 30. The covering material is typically loaded onto the product chute 30 and a first leading edge portion closed before the product chute 30 is mounted to the apparatus 10 as is known to those of skill in the art.

Figure 10:
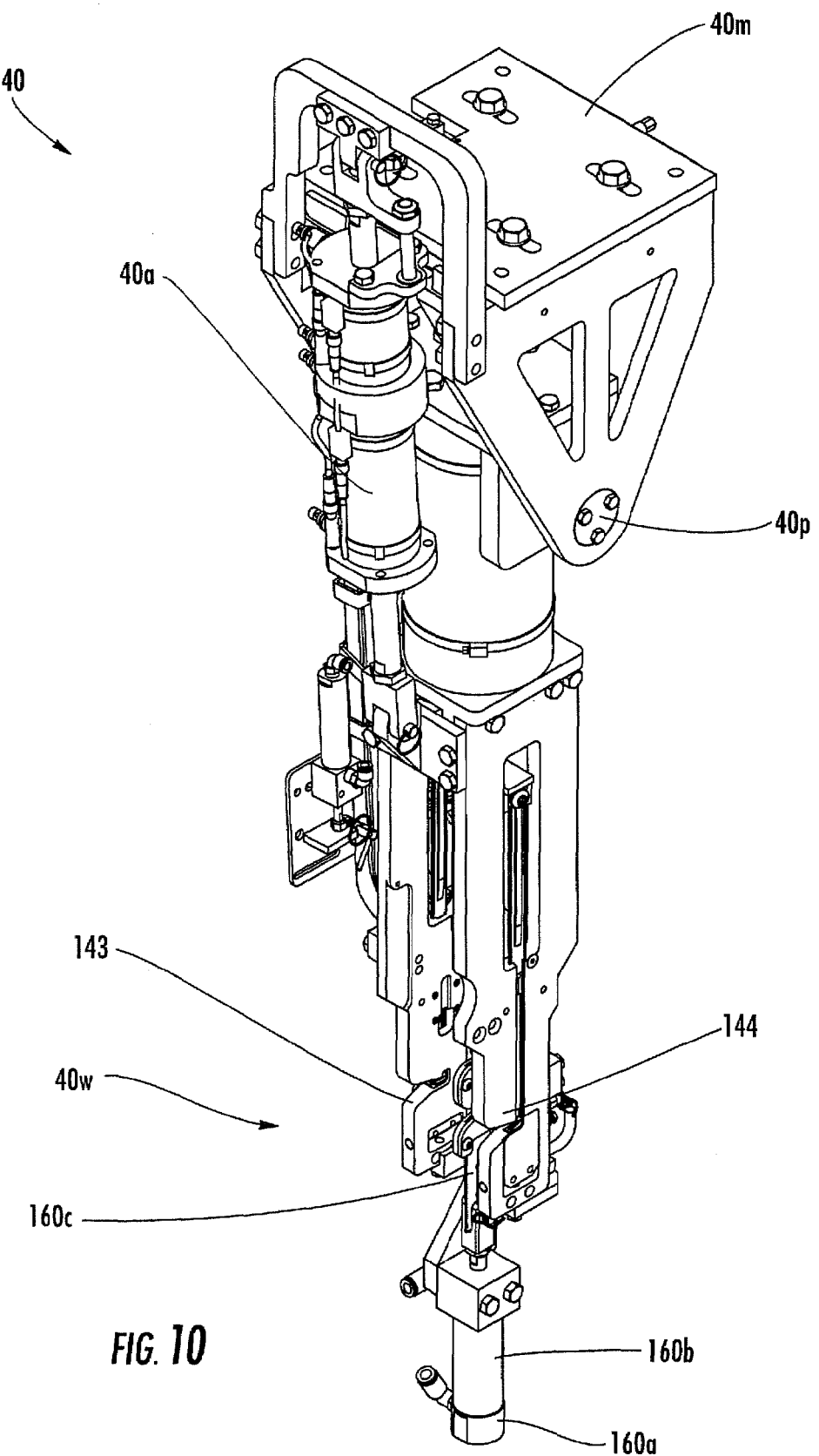
FIG. 10 is a side perspective view of a clipper suitable for use in the device of FIG. 1 according to embodiments of the present invention.

In some embodiments, the product pusher assembly 20 has a pusher head 20h (FIGS. 4 and 5) that contacts the target object(s) or product(s) and pushes the object(s) or product(s) downstream through the product chute 30. After the product exits the product chute 30, the downstream portion or leading edge of the product in the covering material can be held in position proximate the clipper 40 (FIGS. 1, 2 and 10). In certain embodiments, the product can be held by positioning a vertically retractable product holding member and/or clamp bar to inhibit the product from migrating downstream, thereby holding the product in the covering material between the product holding member and the discharge end of the product chute 30 during the clipping operation. See co-pending, co-assigned U.S. patent application Ser. Nos. 10/952,421 and 10/951,578, the contents of which are hereby incorporated by reference as if recited in full herein.

FIG. 2 illustrates the discharge end portion of the product chute 30 that is positioned proximate and upstream of the clipper 40. The product pusher assembly 20 has a pusher head 20h that is adapted to contact the product. The pusher head 20h may be configured to substantially fill the entire cross-sectional width of the product chute cavity 30c as the pusher head 20h approaches and/or exits the discharge portion of the product chute 30d. The clipper 40 is configured to reside in a retracted position out of the product flow region to allow the enclosed product to pass unimpeded until the product rests against a product-holding member.

As shown, in FIGS. 1 and 2, the clipper 40 can be pivotably mounted to a frame and sized and configured to automatically and controllably actuate to advance into a clipping position after the product is in position downstream thereof, then clip the covering material and retract to await to clip the next covering material for the next enclosed product. The clipper 40 may operate in response to data from a proximity sensor that is positioned to detect when a product is ready for clipping and provide the data to a controller or processor. The proximity sensor may be positioned at any suitable place to indicate when the product is in position. The proximity sensor can be an optical sensor (infrared, photosensor, or the like), a hall-effect sensor, a magnetic sensor, an inductive sensor, and/or any other suitable sensor.

FIG. 1 illustrates that the product pusher assembly 20 can include a product pusher cylinder 21 and two product pusher guide rods 22, 23, respectively. The product pusher guide rods 22, 23 can be positioned on opposing sides of the pusher cylinder 21 and help to stabilize (provide an anti-rotation structure) for the pusher head 20h as the pusher head 20h travels outside the product chute 30.

As discussed above, a sensor can be used to provide feedback as to the state of the stop member (open/closed), whether a product is in position in the chute 50b, the product is in the receiving member 52, and/or the pusher head is retracted. This data can be fed to a controller that can then timely activate the actuation cylinder to: (a) release or hold the object in the chute body 50b or advance the product pusher assembly 20. In operation, if an expected product is not delivered within a predetermined time, a timing circuit (typically included in the machine control logic program code) can require an operator to restart the apparatus 10 by depressing a start pushbutton.

As shown in FIG. 3, the apparatus 10 may include another sensor 31 positioned proximate the receiving end of the product chute 30. The sensor 31 is configured to confirm that the product chute 30 is in operative position. When a product is detected in the receiving member 52, the activation of the product pusher assembly 20 may also be based on whether the product chute 30 is determined to be in proper position using data from the sensor 31, typically positioned on the frame thereat. An exemplary sensor is a two-part magnetic switch; one part can be positioned on a mounting bracket attached to a chute bracket and the other part held on the mounting frame. When the two matable parts of the switch 31 engage, the chute 30 is determined to be in proper position. Other types and/or additional sensors may also be used as suitable as is known to those of skill in the art.

A controller/processor (such as a Programmable Logic Controller) may be configured to monitor a signal from this and other sensors and deactivate the product pusher assembly (release cylinder pressure) automatically whenever a product chute 30 position-error is noted, when a product jam, misalignment or other process non-conformance is noted at any time during the process. The signal can be automatically monitored through a Monitoring Circuit Module (also known as a Safety Circuit Module in the machine industry). If the product chute 30 is missing or out of position, the apparatus 10 can be held in a low energy state that removes power to air supplies and controls to inhibit machine operation. To reinitiate the procedure, an operator may press a restart or reset button. In certain embodiments, the clipper 40 may be operated on override even when the chute 30 is absent. Once the product chute 30 is in location and the stop is reset, power air can be applied to the machine control valves and electric power can be applied to the control (PLC) outputs. After the PLC determines the positions of the moveable components, such as the product pusher assembly 20, the clipper 40, the stop member 58, and the like, an automatic reset can be performed and those components automatically moved to a respective home position as needed.

The HMI 55 shown in FIG. 3 can include a start button, an emergency stop button, a reset button and a "clipper only" activation button. The HMI 55 can also include pressure regulators and corresponding gages. The pressure monitors can be for the stop member 58 (FIG. 5) and/or a retractable product holding member downstream of the product chute 30, and/or a retractable brake system typically used to selectively apply brake pressure to the covering material proximate the discharge end portion of the product chute 30. The apparatus 10 may be configured to allow the clipper 40 to operate irrespective of the upstream devices using the clipper pushbutton instead of the apparatus start pushbutton.

It is noted that the floors of various components are shown as sheet metal floors (typically comprising stainless steel). However, all or portions of the staging table 54, the floor 50f of the chute body 50b, the chute floor 30 and/or the floor of the receiving member 52f may include moving floors. For example, rollers, rolling bars, belts or drives may directly advance objects, trays or other support members and the like. In addition, the apparatus 10 can include an automated semi-continuous or continuous advancement system with discrete product(s) separated at desired intervals on the moving floor to serially introduce product to the breech-loader chute 50. In certain embodiments, the moving floor can include partitions, channels, or other spacer configurations to hold the product(s) in desired alignment on the moving floor so that, when the proximity sensor indicates the product is present, the partition or channel provides the desired product stop. The product contacting surfaces may comprise stainless steel or other suitable (typically food compatible) material and may optionally be coated with a friction reducing material such as TEFLON. Lubricants may also be disposed on the inner surface(s) of the sliding or contact floors or walls, such as the breech-loader floor 50f and sidewalls $50s_1$, $50s_2$, the receiving member sidewalls $52s_1$, $52s_2$ and/or floor 52f, and the walls and floor of the product chute 30.

For groups of objects, manual or automated bins or feeders can accumulate the desired amount of grouped objects upstream and place them together on the moving floor (not shown). In other embodiments, an automated counter can be used to count the number of products that pass a target location or enter the chute body 50b so that a desired number of products can be accumulated before activating the product pusher assembly 20.

FIG. 3 illustrates a side view of the product chute 30 held on a mounting bracket 30b. As shown, the product chute 30 can be an elongate product chute. The product chute 30 can include a larger front-end cavity area 30a (shown as a funnel-like shape) relative to the intermediate and/or discharging portion, i.e., the chute cavity 30c narrows in the pushing/product travel direction. Thus, the product chute 30 can include a primary body and a larger upstream guide portion that narrows into the shape of the primary body. The chute 30 may be formed as a unitary member or a series of attached members (not shown). The chute 30 can include a lifting handle 30h to facilitate removal and installation.

The mounting bracket 30b can be configured to relatively easily attach to and be removed from the frame of the apparatus 10 so as to be releasably mountable thereto. The mounting bracket 30b can hold the product chute 30 in alignment with the clipper mechanism 40 downstream and the product pusher mechanism 20 upstream. In certain embodiments, the system 10 can include a first product chute and a respective first mounting bracket 30b and a second product chute 30 releasably mountable to the apparatus frame 10 at the same position (interchangeable chutes) using a respective second mounting bracket 30b that can be configured substantially the same as the first mounting bracket 30b. In other embodiments, the product chute 30 can be lifted off of the mounting bracket 30b (leaving the mounting bracket in place) and another chute 30 placed thereon. The second product chute may be sized and configured the same as the first product chute 30 and loaded with a second supply of covering material. The covering material may be the same or different from that of the first product chute. Thus, the respective first and second mounting brackets 30b can be configured as quick disconnect components (merely loosening and/or releasing attachment hardware) to allow the first and second product chutes 30 to be interchanged on the system 10 in under 5 minutes, and more typically in under about 2 minutes, to allow an operator to employ at least one of a different size product chute, a different configuration product chute, or different packaging material dispensed by the product chute.

As shown in FIGS. 1 and 2, the product pusher assembly 20 can operate using a fluid-actuated cylinder 21 (typically a pneumatic cylinder) that is longitudinally mounted on the apparatus 10 in the axial direction. The centerline of the cylinder 21 may be aligned with the product chute centerline 30. The two guide rods 22, 23 can be stainless steel guide rods mounted in a linear ball bearing block assembly. As noted above, the guide rods 22, 23 can act as an anti-rotation stabilizer for the product pusher assembly 20 and/or help guide the assembly 20 to travel in a substantially straight line through the product chute 30 as the assembly 20 travels repetitively through extended and retracted configurations.

The pusher head 20h may be formed of and/or coated with a non-stick material (and/or lubricant) such as TEFLON polymer. In particular embodiments, such as for packaging of meat, the guidewalls extending rearward from a forward portion of the pusher head may be formed of acetyl polymer while the forward portion can be formed of stainless steel.

Once the covering material is gathered, a clip or clips can be applied to secure the encased product in the covering material. The covering material can then be severed to release the encased product in the clipped package. Typically, two clips are applied substantially concurrently and proximate to each other using a dual clipper 40 so that one clip closes the trailing edge of the covering material forming a first encased package and the other closes a leading edge of the covering material forming the next encased package. The clipped configuration of the covering material encasing the product may be configured to substantially conform to the shape of the enclosed product(s), or may be more loosely configured.

FIG. 10 illustrates an exemplary clipper 40 according to embodiments of the present invention. The clipper 40 may be particularly suitable for clipping netting but may be used for other materials as well. As shown, die supports 143 and 144 are mounted to the lower portion of the clipper 40 with the clip window 40w therebetween. The clipper 40 includes a pivot attachment aperture that is sized and configured to receive a shaft 40p therethrough, which is supported by a mount bracket 40m (which is in turn secured to the apparatus 10) to pivotally mount the clipper 40 to the apparatus frame. The clipper 40 can also include a piston actuator assembly 40a that, in operation, moves the clipper 40 in and out of operative position about the travel path of the product. The assembly 40a may be pivotally coupled to the clipper 40 and the mount bracket 40m, respectively. The assembly 40a may include a pneumatic cylinder actuator.

The die supports 143, 144 may be configured to automatically gather a portion of the tube or sleeve of covering material to form the material into a rope-like and/or compressed configuration in preparation for receiving the clip(s) thereabout. The die supports 143, 144 are configured to gather or compress the covering material that extends through the clipper 40 and beyond the product chute discharge end portion 30d (FIG. 2) in preparation for receiving the clip(s) thereabout. Voider plates may be provided to automatically gather a portion of the tube or sleeve of covering material to form the material into a rope-like and/or compressed configuration that is provided to the clipper 40 so that the die supports 143, 144 only perform a final gathering of the covering material.

According to other embodiments (not shown), gathering plates may be provided on the clipper 40 and configured to automatically gather a portion of the tube or sleeve of covering material to form the material into a rope-like and/or compressed configuration in preparation for receiving the clip(s) thereabout. These gathering plates may be paired with plates on the opposing side of the axial center line (not shown) across the product travel path to retractably travel toward each other, substantially orthogonal to the direction of product travel, to gather the covering material therebetween.

A brake assembly (not shown) may be configured to automatically deploy to selectively apply a force against the chute 30 to hold the covering material during the clipping operation as will be discussed further below.

FIG. 10 also illustrates the clipper 40 with a modular interchangeable cutting cartridge 160b. Each cutting cartridge has a respective retractable cutting implement 160c and an associated actuator 160a. In operation, after a clip(s) is applied to the gathered covering material 130 (FIG. 1), the attached cutting implement 160c can be automatically extended to sever the material. The cutting cartridge 160b is configured to cut through the gathered covering material.

Each modular cartridge can include a platform that is configured to slidably insert in a receiving channel or groove on the clipper 40. The desired modular cutting cartridge 160b can be selected and, using a quick disconnect feature, interchanged and used as appropriate for the type of covering material in the apparatus 10. The cutting cartridge can be a knife and/or employ heat or other cutting means. Examples of suitable hot-knife devices are described in U.S. Pat. Nos. 4,683,700 and 5,161,347, the contents of which are hereby incorporated by reference as if recited in full herein. In certain embodiments using covering materials having certain types of fibers, the covering material fibers may melt and thermodynamically seal any loose ends, thereby capturing particles that may otherwise become loose.

Generally stated, referring to FIG. 10, the clipper 40 defines a closure/clip delivery path using a clip guide rail (not shown) in communication with the clip window 40w in a clip channel for receipt of a U-shaped metal clip. The clip is advanced in the closure path or channel by means of a punch so that the clip will engage a die positioned in a manner permitting the clip to be formed about gathered material that encases the product in the material at a closure zone in the product travel path. Although not illustrated, pressurized air or other means of pressing or moving the clip to close about the tubular package may also be used. The clip guide rail can have a curvilinear configuration with a vertical run which is curved at its lower end so that it gradually merges into a horizontal run to direct clips mounted thereon into the window 40w. The clips are typically arranged in a stack with adjacent clips abutting each other so that the legs of each clip fit around the guide rail with a crown of each clip fitting over the guide rail. The multiple clips may be connected to one another by means of a thin elastomeric film, tape or adhesive (typically along the crown) so that the clips together may slide down the guide rail and around the bend therein between the vertical and horizontal runs of the guide rail. Typically, clips are provided in a coil or on a reel for feeding onto the guide rail. Although illustrated herein as a generally vertical and downwardly directed clip feed, other feed orientations may also be employed.

To generally summarize some embodiments, when a product or target object is discharged from the breech-loader primary chute body 50b, it enters the product transfer zone. Its presence and/or the timing of the product discharge can be automatically determined and the apparatus controller can then activate an automated cycle. The automated cycle can include actuating the product pusher assembly cylinder 21 after the product or object is dropped into the product primary flow path proximate or in the chute 30 (typically in the receiving member 52). The product pusher head 20h advances to engage the target product, which is pushed through the product chute 30 encased in covering material (i.e., netting) upon exit from the product chute 30. Upon exiting the product chute 30, the encased product can be pushed onto the product table. When the product pusher assembly 20 reaches the end of its forward stroke, its position is detected by a sensor, such as a Hall-effect switch, and a product holding member can be actuated. Then, the product pusher assembly 20 is retracted into the product chute before the covering material is gathered and clipped. The product pusher cylinder 21 does not have to be fully retracted prior to initiation of the automated gathering and clipping operations. Once the product pusher head 20h clears the discharge end of the product chute 30, an intermediate sensor, such as another Hall-effect switch, typically placed on the product pusher cylinder 21, senses the retraction thereof. When the sensor is activated, the apparatus 10 can automatically (i.e., typically via the PLC) proceed to initiate the gathering and clipping operations and/or a new target object can be discharged from body 50b. In some embodiments, the pusher head is fully retracted to its home position before the next product is released from the overhead chute body 50b.

Thus, substantially concurrently to the retraction of the pusher head 20h, the clipper 40 can automatically pivot into position, thereby advancing the clipper gathering plates 143, 144 to converge the covering material into a rope-like configuration. Then two closure clips can be applied thereto. The downstream clip ends the first product and the upstream clip defines the first end portion of the next product. The cutting cartridge is actuated and the covering material is severed between the two clips. Once the severing is complete, the cutting cartridge is retracted and the apparatus 10 can automatically start a reset cycle by opening the clipper gate, returning the clipper 40 to its home position. The product-holding member can be moved and the product released to travel downstream. When the clipper 40 and gathering plates are substantially in their home position, the apparatus 10 can begin the cycle again. When the product pusher assembly 20 reaches its retracted configuration, the stop member 58 can opened again to allow another object or product to drop into position so that when the reset is complete, another product is in position for entry into the product chute 30. In some embodiments, if a product is not detected in the transfer zone 65 in a predetermined time, the apparatus 10 can shut off and wait for a start signal to reactivate the process/apparatus, such as via a pushbutton at the HMI station.

The operation and sequence of events can be controlled by a programmable logic controller. Certain operations may be selected by an operator input using a Human Machine Interface ("HMI") as discussed above to communicate with the controller as is well known to those of skill in the art.

Figure 11:
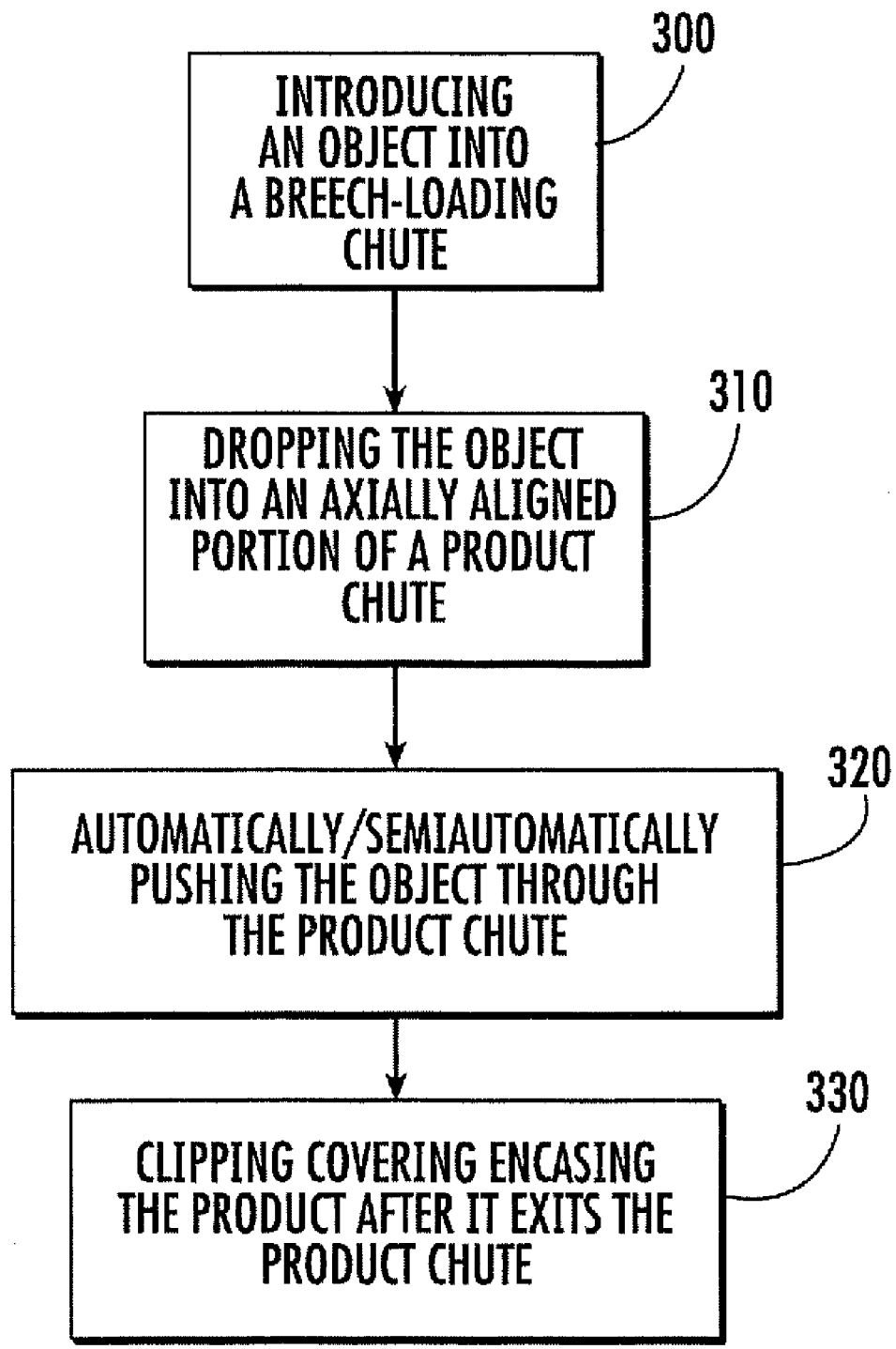
FIG. 11 is a flow chart of operations that can be carried out according to embodiments of the present invention.

FIG. 11 illustrates exemplary operations that may be carried out according to embodiments of the present invention. As shown, at least one target object can be introduced into a breech-loading chute (Block 300). The target product can be dropped into an axially aligned position with the product chute (Block 310). The pusher can be automatically or semi-automatically advanced to push the object through the product chute after the dropping step (Block 320). A covering encasing the product can be clipped after a portion or the entire product exits the product chute (Block 330).

The initiation of the automatic pushing operation can be based on a sensed presence of the target object in a product transfer zone. The covering material can be pulled downstream off the exterior surface of the product chute (which includes pulling from a covering material mounting device mounted over the product chute) to automatically enclose the object in the covering material as the product exits the product chute. The covering material can be automatically selectively slowed or inhibited from further release by applying a braking force thereto to press the covering material against the outer surface of the product chute.

Figure 12:
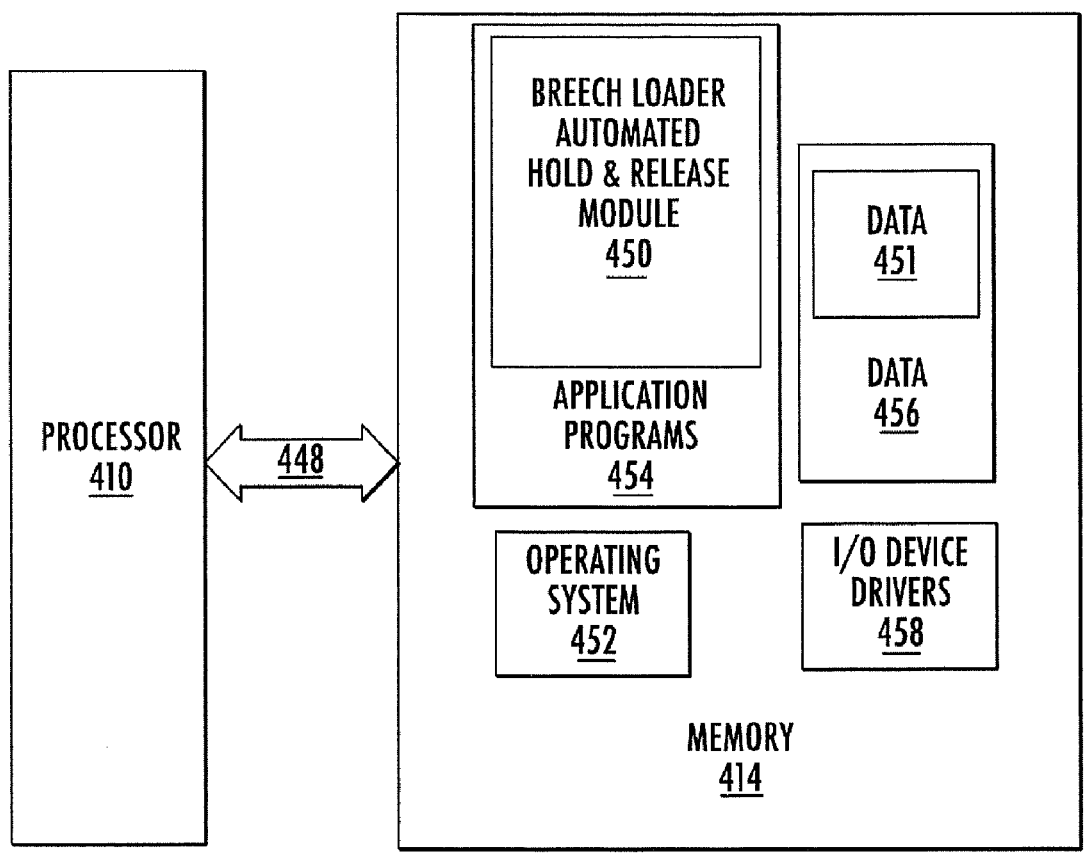
FIG. 12 is a block diagram of a data processing system/computer program according to embodiments of the present invention.

FIG. 12 is a block diagram of exemplary embodiments of data processing systems that illustrates systems, methods, and computer program products in accordance with embodiments of the present invention. The data processing systems may be incorporated in a programmable logic controller and/or be in communication therewith. The processor 410 communicates with the memory 414 via an address/data bus 448. The processor 410 can be any commercially available or custom microprocessor. The memory 414 is representative of the overall hierarchy of memory devices containing the software and data used to implement the functionality of the data processing system. The memory 414 can include, but is not limited to, the following types of devices: cache, ROM, PROM, EPROM, EEPROM, flash memory, SRAM, and DRAM.

As shown in FIG. 12, the memory 414 may include several categories of software and data used in the data processing system: the operating system 452; the application programs 454; the input/output (I/O) device drivers 458; the Breech-loader Automated Hold and Release Module 450; and the data 456.

The data 451 may include a look-up chart of pusher cycle times, pusher and stop member synchronization data, different products, pushing rates, covering material lengths, proximity sensor feedback, safety interlock circuits and the like 456 corresponding to particular or target products for one or more producers, which may allow an operator to select certain operational parameters at the start of each shift and/or production run and the like.

As will be appreciated by those of skill in the art, the operating system 452 may be any operating system suitable for use with a data processing system, such as OS/2, AIX, DOS, OS/390 or System390 from International Business Machines Corporation, Armonk, N.Y., Windows CE, Windows NT, Windows95, Windows98 or Windows2000 from Microsoft Corporation, Redmond, Wash., Unix or Linux or FreeBSD, Palm OS from Palm, Inc., Mac OS from Apple Computer, LabView, or proprietary operating systems. The I/O device drivers 458 typically include software routines accessed through the operating system 452 by the application programs 454 to communicate with devices such as I/O data port(s), data storage 456 and certain memory 414 components. The application programs 454 are illustrative of the programs that implement the various features of the data processing system and preferably include at least one application, which supports operations according to embodiments of the present invention. Finally, the data 456 represents the static and dynamic data used by the application programs 454, the operating system 452, the I/O device drivers 458, and other software programs that may reside in the memory 414.

While the present invention is illustrated, for example, with reference to the Breech-loader Automated Hold and Release Module 450 being an application program in FIG. 12, as will be appreciated by those of skill in the art, other configurations may also be utilized while still benefiting from the teachings of the present invention. For example, the Module 450 may also be incorporated into the operating system 452, the I/O device drivers 458 or other such logical division of the data processing system. Thus, the present invention should not be construed as limited to the configuration of FIG. 12, which is intended to encompass any configuration capable of carrying out the operations described herein.

The I/O data port can be used to transfer information between the data processing system, the product pusher, the staging platform, the stop member and loading chute, the receiver floor 580 (FIGS. 14-18) and the closure attachment mechanism or another computer system or a network (e.g., the Internet) or to other devices controlled by the processor. These components may be conventional components such as those used in many conventional data processing systems which may be configured in accordance with the present invention to operate as described herein.

For example, certain embodiments of the present invention are directed to a computer program product for operating an automated clipped (netting) packaging apparatus. The automated packaging apparatus can include a breech-loading chute, an automated product pusher mechanism that advances and retracts from a product chute to advance a product introduced from the breech-loading chute, and an automated clipping apparatus that applies at least one closure clip to netting thereat. The computer program product can include: (a) computer readable program code that automatically controllably actuates at least one stop member associated with the breech loading chute; (b) computer readable program code that automatically controllably actuates a pusher actuation cylinder to push a product pusher in a downstream direction; and (c) computer readable program code that automatically controllably actuates a clipper mechanism to position a clipping apparatus in a clipping position in response to product pushed by the product pusher out of the product chute and covered in netting.

In particular embodiments, the computer program product can also include one or more of: (a) computer readable program code that automatically controllably serially advances discrete objects into the loading chute; (b) computer readable program code that automatically controllably actuates a package holding member to raise a holding member above a product support floor to maintain a product held in netting in alignment with the clipper mechanism; (c) computer readable program code that monitors a proximity sensor positioned to detect when a product is in position to be packaged and/or when a product is released from an egress portion of the loading chute, then automatically controllably actuates the pusher cylinder in response thereto; (d) computer readable program code that prevents actuation of the pusher cylinder when the product chute or breech loading chute (and/or ceiling thereof) is not in proper position; (e) computer readable program code that actuates a cutting tool actuation cylinder to controllably advance the cutting tool and automatically sever netting intermediate two clips thereon; (f) computer readable program code that supplies heat to the cutting tool; (g) computer readable program code that automatically actuates clip pushers in the clipper mechanism when netting is gathered and in position for clipping at the clipping window; (h) computer readable program code that controls the actuation of a braking mechanism to advance the braking mechanism to contact the product chute and selectively apply pressure to netting thereat; (i) computer readable program code that automatically controllably actuates the pusher actuation cylinder to pull a product pusher in an upstream direction out of the product chute; and (j) computer readable program code that automatically controllably actuates the clipper mechanism to remove the clipping apparatus from the clipping position.

While the present invention is illustrated, for example, with reference to particular divisions of programs, functions and memories, the present invention should not be construed as limited to such logical divisions. Thus, the present invention should not be construed as limited to the configuration of FIG. 12 but is intended to encompass any configuration capable of carrying out the operations described herein.

Figure 13:
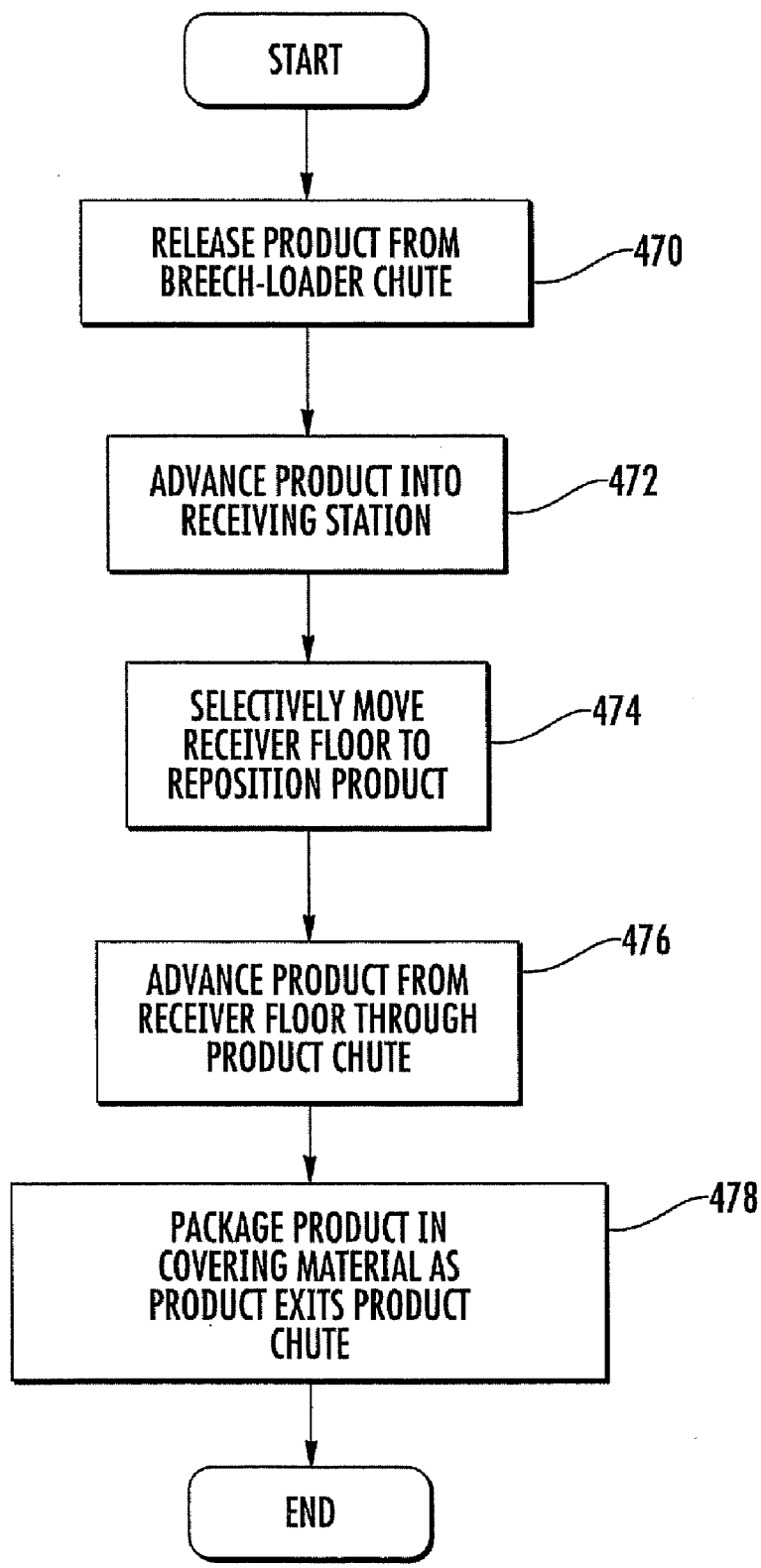
FIG. 13 is a flow chart of operations that can be carried out according to further embodiments of the present invention.

FIG. 13 illustrates exemplary operations that may be carried out according to further embodiments of the present invention. In accordance with method and/or system operational embodiments of the present invention, a target product is released from an elongate breech-loader chute (Block 470). The breech-loader chute has a primary chute body with opposing ingress and egress end portions. The primary chute body slopes downwardly in a direction of product travel. The target product is advanced into a receiving station disposed below the breech-loader chute such that the target product is received on a receiver floor of the receiving station downstream of the breech-loader chute (Block 472). The receiver floor is selectively moved (typically in a downward direction) with the target product thereon to reposition the target product for delivery to an elongate product chute having opposing ingress and egress end portions with an interior cavity extending therethrough (Block 474). According to some embodiments, the movement of the receiver floor changes the angle of the receiver floor with respect to horizontal. The target product is advanced from the receiver floor into and through the interior cavity of the product chute (Block 476). The target product is packaged in covering material held on the product chute as the target product exits the product chute (Block 478).

With reference to FIGS. 14-21, an automatic clipping packaging apparatus 510 according to further embodiments of the present invention is shown therein. The apparatus 510 may substantially correspond to (i.e., include the various features, components and functions of) the automatic clipping packaging apparatus 10 as described herein, except as discussed hereinbelow. For purposes of description, components of the apparatus 510 directly corresponding to the components of the apparatus 10 are designated with the same numerals as used in describing and illustrating the foregoing embodiments. The apparatus 510 includes the product pusher assembly mechanism 20, the product chute 30, the HMI 55, and the stop member 58. The apparatus 510 may also include the clipper 40, the handle maker 60 and the housing guards 11; however, these components are omitted from FIGS. 14-17 for the sake of clarity. The apparatus 510 may further include a control system 502 (FIG. 21), a breech-loader chute 550, a receiving station 570, a transition zone 565 and a floor drive mechanism 590, as discussed in more detail hereinbelow. In this embodiment, the receiving station 570 replaces or works with the receiving member 52 and the breech-loader chute 550 replaces the breech-loader chute 50.

Figure 14:
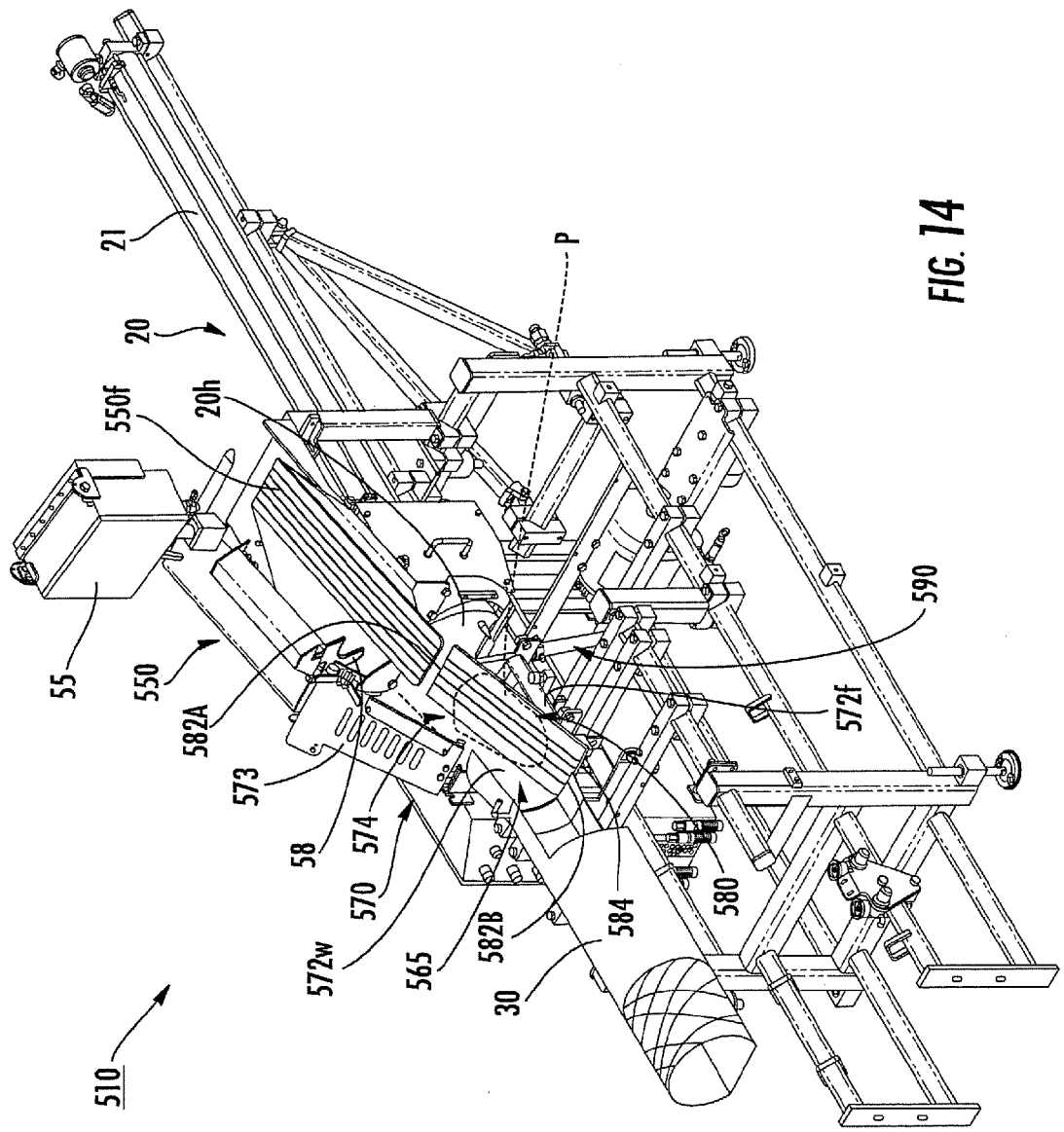
FIG. 14 is a fragmentary, perspective view of an automatic clipping packaging apparatus according to further embodiments of the present invention, wherein a receiver floor thereof is in a receiving position.
Figure 15:
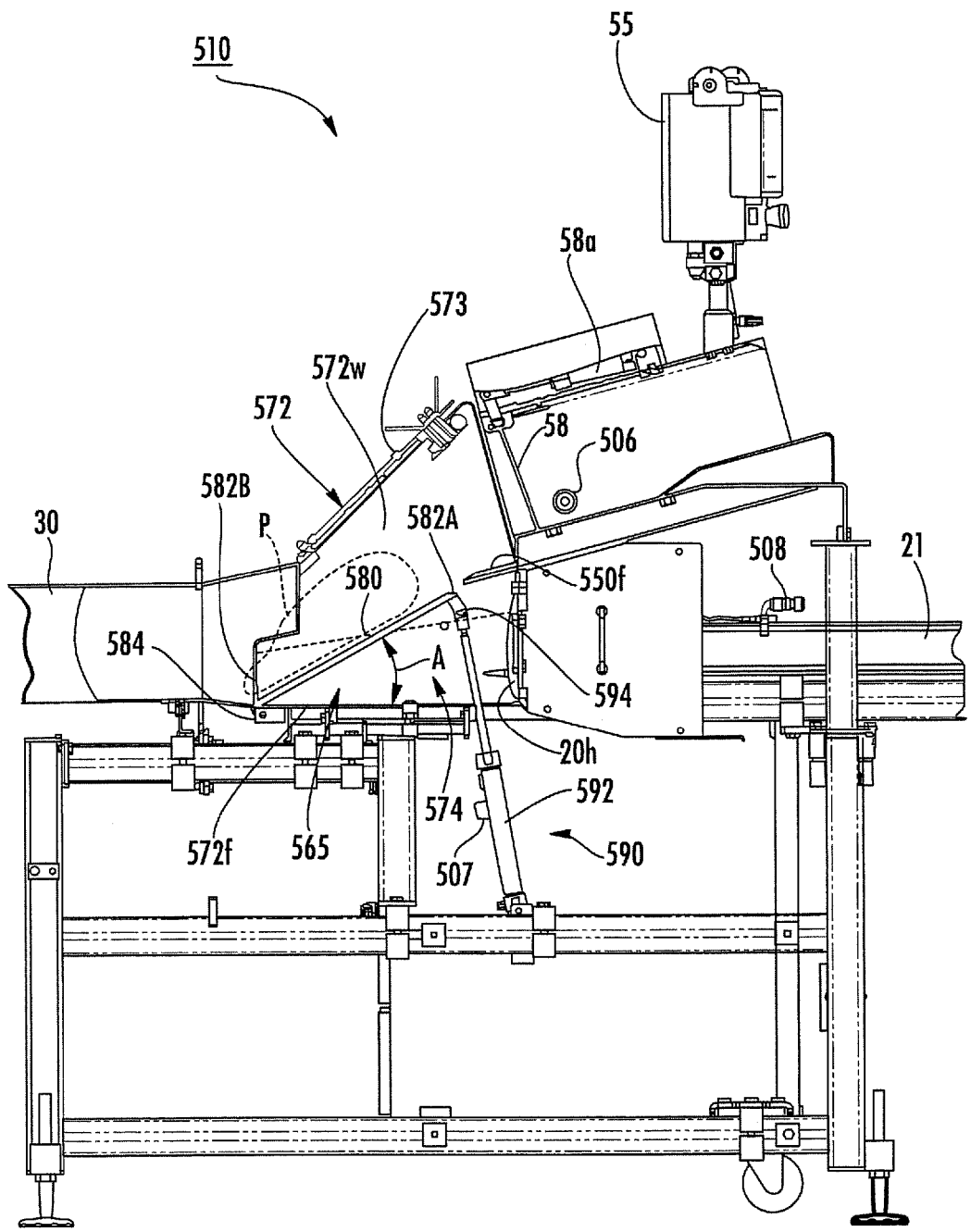
FIG. 15 is a fragmentary, side view of the automatic clipping packaging apparatus of FIG. 14 wherein the receiver floor is in the receiving position.

The receiving station 570 includes a housing 572 (FIGS. 14 and 15). The housing 572 includes opposed sidewalls 572w and a bottom wall 572f. A movable ceiling 573 corresponding to the movable ceiling 53 covers the housing 572. The housing 572 and the movable ceiling 573 define a chamber 574. The transition zone 565 is located in the chamber 574.

A receiver floor member (receiver floor) 580 is disposed in the housing 572. The receiver floor 580 has an ingress end 582A and an opposing egress end 582B. The ingress end 582A is free of the housing floor 572f and the egress end 582B is pivotally coupled to the housing floor 572f by a hinge 584. The receiver floor 580 can be selectively pivoted upwardly away from the floor 572f about the hinge 584 via a receiver floor drive mechanism 590.

With reference to FIGS. 18 and 19, the floor 580 can have a plurality of vertically upstanding, spaced apart ribs 586 that extend longitudinally along the upper surface of the receiver floor 580. The ribs 586 define shallow channels 586A therebetween. According to some embodiments, each rib 586 extends substantially parallel to a rib axis A-A (FIG. 18). According to some embodiments, the axis A-A is substantially parallel to the product travel path. According to some embodiment, each rib 586 has a height H1 (FIG. 19) in the range of from about 3/16 to 1/4 inch.

The receiver floor 580 may be formed of any suitable, food compatible material. According to some embodiments, the receiver floor 580 is formed of stainless steel and may optionally be coated with a friction reducing material such as TEFLON. Lubricants may also be disposed on the upper surfaces of the receiver floor 580.

Figure 17:
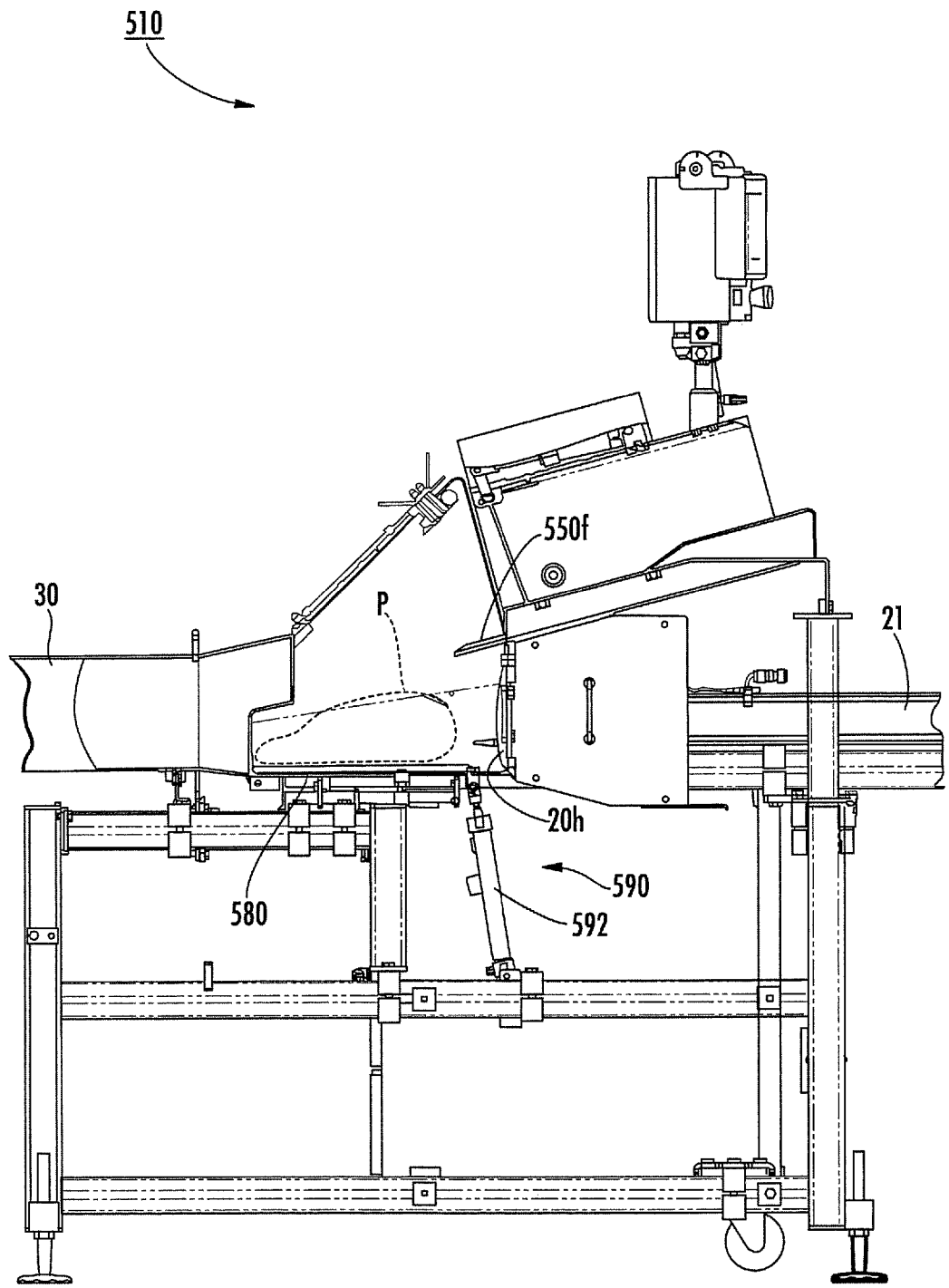
FIG. 17 is a fragmentary, side view of the automatic clipping packaging apparatus of FIG. 14 wherein the receiver floor is in the staging position.

With reference to FIGS. 15 and 17, the receiver floor drive mechanism 590 includes a force or drive actuator 592 and a linkage 594 operably connecting the drive actuator 592 to the receiver floor 580. According to some embodiments, the drive actuator 592 is a pneumatic cylinder. However, other types of drive actuators and/or drive configurations may be used, for example, a hydraulic cylinder, a solenoid, an electric step motor, and the like.

Figure 16:
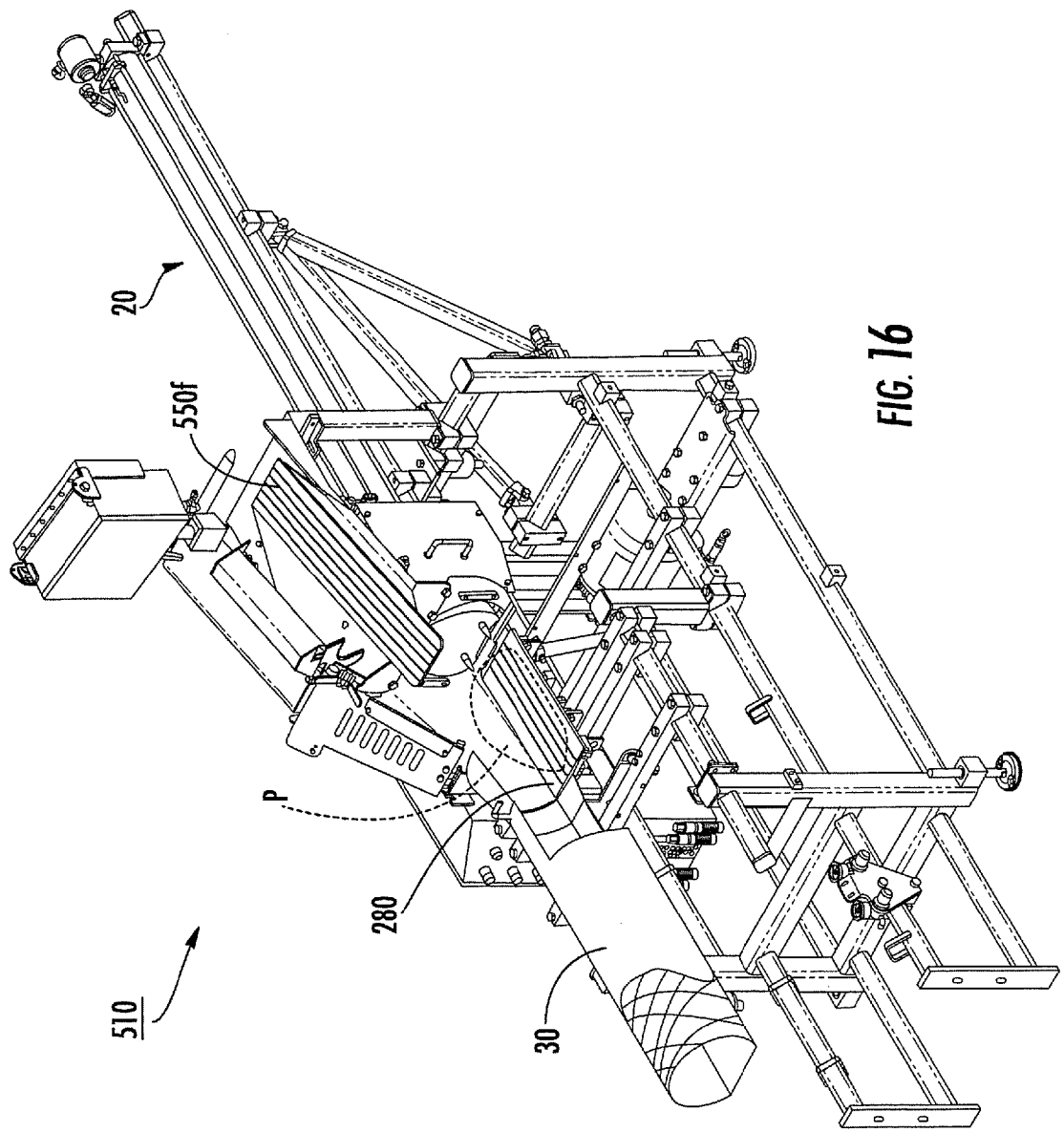
FIG. 16 is a fragmentary, perspective view of the automatic clipping packaging apparatus of FIG. 14 wherein the receiver floor is in a staging position.

The drive actuator 592 is selectively automatically movable between an extended position (as shown in FIGS. 14 and 15) and a retracted position (as shown in FIGS. 16 and 17). When in the extended position, the drive actuator 592 holds the receiver floor 580 in a raised or receiving position (as shown in FIGS. 14 and 15) wherein the receiver floor 580 is typically angled downwardly. When in the retracted position, the drive actuator 592 holds the receiver floor 580 in a lowered or staging position (as shown in FIGS. 16 and 17) wherein the receiver floor 580 is typically substantially horizontal. When in the receiving position, the ingress end 582A is disposed adjacent the egress end of the breech-loader chute floor 550f. As shown in FIG. 15, a small gap space may extend between the floor 550f and the ingress end 582A of the receiver floor 580.

The breech-loader chute 550 may be configured and constructed in the same manner as described above with regard to the breech-loader chute 50. In some cases, the chute 550 (or 50) can include vertically upstanding, spaced apart ribs 552 (FIGS. 18 and 20) extending longitudinally along the upper surface of the floor 550f of the breech-loader chute 550. The ribs 552 define shallow channels 552A therebetween. According to some embodiments, each rib 552 extends substantially parallel to a rib axis B-B (FIG. 18). According to some embodiments, the axis B-B is substantially parallel to the product travel path. According to some embodiments, the axis B-B is substantially parallel to the axis A-A. According to some embodiments and as illustrated, the ribs 586 are laterally offset from the ribs 552. According to some embodiments, each rib 552 has a height H2 (FIG. 20) in the range of from about 3/16 to 1/4 inch.

The floor 550f may be formed of any suitable, food compatible material. According to some employment, the floor 550f is formed of stainless steel and may optionally be coated with a friction reducing material such as TEFLON. Lubricants may also be disposed on the upper surfaces of the floor 550f.

Figure 21:
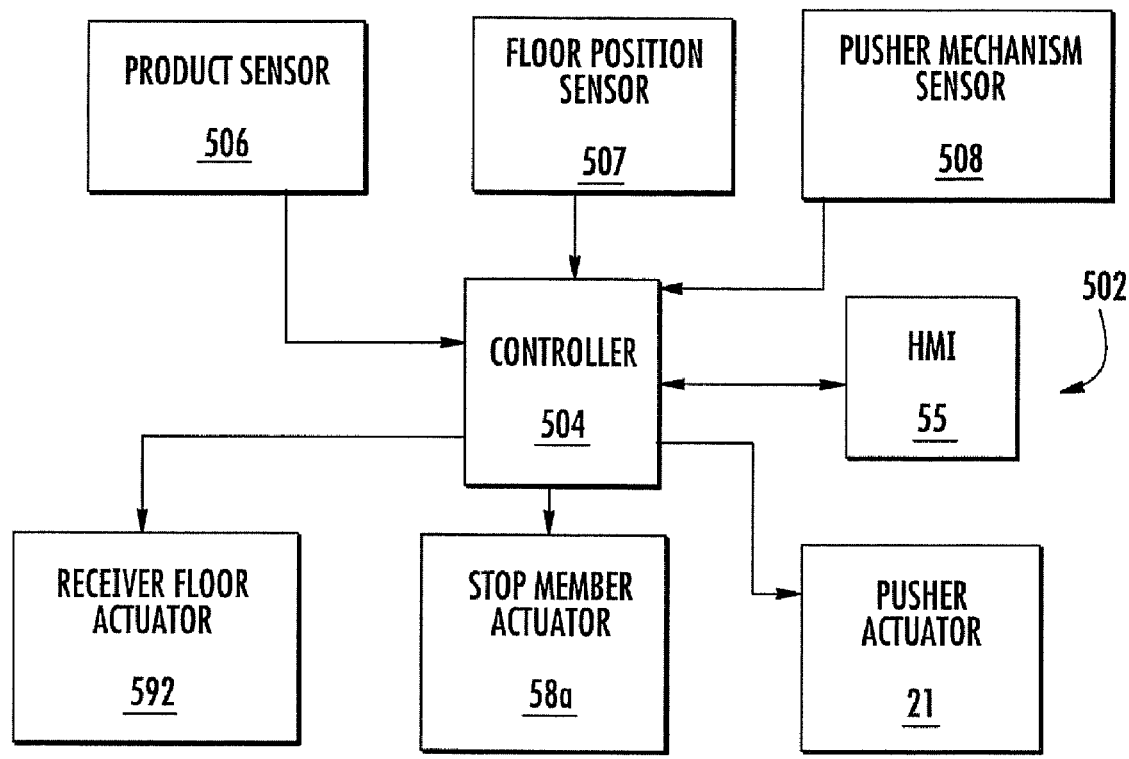
FIG. 21 is a schematic diagram of a control system forming a part of the automatic clipping packaging apparatus of FIG. 14 according to embodiments of the present invention.

With reference to FIG. 21, the control system 502 can include a controller 504, which may include the controller or PLC as described above with regard to the apparatus 10. The control system 502 further includes a product sensor 506, a floor position sensor 507, and a pusher mechanism sensor 508. The sensors 506 and 508 may be as described above with regard to the apparatus 10. The control system 502 may be operably connected to the HMI 55 (FIG. 15). The control system 502 is further operably connected to the receiver floor drive actuator 592, the stop member actuator 58a, and the pusher actuator 21.

According to some embodiments, and as described herein, the sensor 506 detects the presence of a target product passing through the breech-loader chute 550. The pusher mechanism sensor 508 is operably associated with the actuator 21 to detect whether the pusher mechanism 20 is in its fully retracted position. The floor position sensor 507 may be associated with the drive actuator 592 to determine whether the drive actuator 592 is in its retracted (staging) position.

The apparatus 510 may be used as follows to enclose a target product P in a covering material. The target product P is introduced into the breech-loader chute 550 through the ingress end thereof. If the pusher head 20h is fully retracted (i.e., in the home position), the control system 502 operates the drive actuator 592 to position or maintain the receiver floor 580 in its extended receiving position as shown in FIGS. 14 and 15. Also, the control system 502 operates the stop member actuator 58a to position or maintain the stop member 58 in its open position. In this case, the target product P is permitted to slide down the breech-loader chute floor 550f. Because the upstream edge of the receiver floor 580 is positioned adjacent (according to some embodiments, immediately adjacent or underlapping) the downstream end of the floor 550f and the receiver floor 580 is sloped with respect to horizontal, the target product P continues to slide down the receiver floor 580 under force of gravity.

The chute sensor 506 may serve to notify the controller 504 that the target product P is in position or will shortly be in position (depending on the location of the sensor) at the bottom of the receiver floor 580. The controller 504 will then operate the drive actuator 592 to lower the receiver floor 582 to its staging position as shown in FIGS. 16 and 17. The receiver floor 580 and the target product P are thereby aligned with the product chute 30. More particularly, the angle of the receiver floor 580 with respect to horizontal is changed. In this way, the receiver floor 580 is positioned out of the extension path of (below) the pusher head 21h and the target product P is placed into the path of the pusher head 20h and the travel path associated with the product chute 30. More particularly, the target product P may be centered at the ingress end portion of the product chute 30, in axial and side-to-side alignment with the product chute 30 upstream of the product chute 30.

Once the control system 502 detects that the drive actuator 592 is fully retracted (and thus, the receiver floor 580 is in its staging position) via the floor position sensor 507, the control system 502 operates the pusher actuator 21 to extend the pusher head 21h. In this manner, the target product P is pushed off of the receiver floor 580 and through the product chute 30 as described above. The target product P may thereafter be covered, clipped, etc. to package the target product as described above.

The control system 502 thereafter returns the pusher head 21h to its retracted position. Once the control system 502 detects that the pusher mechanism 21 is to its retracted position (and, thus, clear of the receiver floor 580) via the sensor 508, the control system 502 operates the drive actuator 592 to raise the receiver floor 580 back up to its receiving position. The control system 502 may thereafter await the introduction of the next target product through the chute 550, whereupon the automatic cycle is re-executed.

In the foregoing manner, the floor position sensor 507 may serve as a failsafe feature to prevent the pusher mechanism 20 from colliding with the receiver floor 580 or vice versa. However, other sensor and/or logic configurations may be employed to provide such protection.

The methods and apparatus 510 may provide advantageous improvement in the handling of target products for packaging. In some cases, it may be desirable to maintain and/or controllably alter the orientation of the target product in certain respects. For example, a user may wish to package a variety of hams having different configurations such as a full shank, half shank, shankless, and semi-boneless ham. The user may require that when the packaged ham is subsequently hung (e.g., from a smokehouse tree), the bone in the product is always vertical. In this case, the orientation of the product as presented to the pusher head 21h should be consistent so that the product is properly centered with respect to the clipper 40. In some cases, such as with a full shank ham, the shank (basically, the bone portion) will serve to steer the ham down the chute 550 so that it is properly oriented in the transfer zone 565 and, ultimately, with respect to the clipper 40.

However, with a shankless ham there may be nothing about its shape that can suitably steer the ham to maintain the proper orientation. According to some embodiments of the present invention, the apparatus 510 can advantageously control the orientation of the target product P so that the target product is desirably oriented when presented or staged for the pusher head 21h. The floor ribs 552, 586 and the selectively movable receiver floor 580 may serve (individually and/or cooperatively) to maintain and modify aspects of the orientation of the target product.

The ribs 552, 586 cause the target product P to track straight as the target product slides down the breech-loader chute floor 550f and the receiver floor 580 such that the target product does not unduly rotate or skew. In this way, the yaw rotational orientation of the target product as delivered to the chute 550 is preserved.

Because the target product P is controllably supported by the floors 550f, 580 all the way to the bottom of the receiver floor 580 and then controllably lowered into the staging position (i.e., by lowering the receiving floor 580), the orientation of the target product is not randomly disrupted as may occur if the target product were dropped from the downstream end of the breech-loader chute floor 550. Instead, the adjacent floors 550f, 580 may form a substantially continuous slide assembly from the entry of the breech-loader chute 550 to the housing floor 572f. The receiver floor 580 is pivotally lowered and reoriented to thereby lower and reorient the target product into position. More particularly, the movement of the receiver floor 580 changes the pitch of the target product. According to some embodiments, the receiver floor 580 is substantially parallel with the axial centerline of the product chute 30 when in the staging position. According to some embodiments, the receiver floor 580 is substantially horizontal when in the staging position. In this manner, the apparatus 510 enables gravity feeding of the target product while nonetheless providing for product orientation control.

According to some embodiments, the controller 504 automatically actuates each of the receiver floor actuator 592, the stop member actuator 58a, and the pusher actuator 21 responsive to the signals or feedback from the sensors 506, 507, 508 to automatically execute the pusher cycle as described above.

According to some embodiments, when the receiver floor 580 is in the receiving position, the angle A (FIG. 15) of the receiver floor 580 with respect to horizontal is in the range of from about 25 to 30 degrees.

According to some embodiments, all or portions of the breech-loader chute floor 550f and/or the receiver floor 580 may include moving floors. For example, rollers, rolling bars, belts or drives may directly advance objects, trays or other support members and the like.

According to some embodiments and as shown, the product pusher assembly mechanism 20, the product chute 30, the breech-loader chute 550, and the receiving station 570 (including the receiver floor 580) are all mounted on the same frame.

Data processing systems in accordance with embodiments of the present invention employing a selectively movable receiver floor may be configured as illustrated and described above with regard to FIG. 12, with suitable modifications to control the receiver floor drive actuator 592 and process signals from the floor position sensor 507. The Breech-loader Automated Hold and Release Module 450 may be modified or supplemented with a further module configured to effect such control and processing. Certain embodiments of the present invention are directed to a computer program product for operating an automated or semi-automated packaging apparatus with a netting chute to package a target product. The computer program product comprises computer readable program code that directs a floor drive mechanism to automatically and controllably move a receiver floor of a receiving station between a receiving position, wherein the receiver floor is positioned adjacent a breech-loader chute floor, and a staging position, wherein the receiver floor is spaced apart from the breech-loader chute floor and positioned to place the target product into a product travel path associated with a product chute.

The flowcharts and block diagrams of certain of the figures herein illustrate the architecture, functionality, and operation of possible implementations of selective implementation of single and dual clip closure means according to the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A system for enclosing a target product in a covering material, the system comprising:
   an elongate product chute having opposing ingress and egress end portions with an interior cavity extending therethrough;
   an elongate breech-loader chute having a primary chute body with opposing ingress and egress end portions, the breech-loader chute residing above and upstream of the product chute in cooperating alignment therewith, the primary chute body sloping downwardly in a direction of product travel; and
   a receiving station disposed below the breech-loader chute and including a receiver floor having an upper surface and that receives and supports a target product from the breech-loader chute on the upper surface, wherein the receiver floor is selectively movable between an extended receiving position and a retracted staging position to thereby support and move the target product for delivery to the product chute.

2. The system of claim 1 wherein the primary chute body includes a breech-loader chute floor, wherein the receiver floor, when in the receiving position, is positioned adjacent the breech-loader chute floor and, when in the staging position, is spaced apart from the breech-loader chute floor and positioned to place the target product into a product travel path associated with the product chute.

3. The system of claim 2 wherein the breech-loader chute is a gravity assisted loading chute configured to slidably advance the target product through the breech-loader chute and onto the receiver floor, and the receiver floor, when in the staging position, positions the target product proximate the product chute so that the target product is generally laterally centered at the ingress end portion of the product chute.

4. The system of claim 2 including a floor drive mechanism operable to selectively move the receiver floor between the receiving position and the staging position.

5. The system of claim 4 wherein the floor drive mechanism is operable to selectively lower the receiver floor from the receiving position to the staging position and to selectively raise the receiver floor from the staging position to the receiving position.

6. The system of claim 4 wherein the floor drive mechanism is operable to change an angle of the receiver floor with respect to horizontal such that the receiver floor is disposed at a first angle when in the receiving position and at a second angle when in the staging position, the first angle being different than the second angle.

7. The system of claim 6 wherein, when the receiver floor is disposed at the second angle, the receiver floor is substantially parallel with an axial centerline of the product chute.

8. The system of claim 1 wherein:
   the receiver floor includes a plurality of receiver guide ribs on the receiver floor; and
   the primary chute body includes a breech-loader chute floor and a plurality of breech-loader chute guide ribs on the breech-loader chute floor, wherein the receiver guide ribs and the breech-loader chute guide ribs extend substantially parallel to the direction of product travel.

9. The system of claim 1 wherein the primary chute body is disposed above and substantially rearward of the product chute, and the receiver floor extends forward of the breech-loader chute and rearward of the product chute.

10. The system of claim 1 further comprising a clipper mechanism disposed downstream of the product chute, the clipper mechanism configured to apply at least one clip to a covering material that encloses the target product after at least a portion of the target product exits the product chute.

11. The system of claim 1 wherein the receiving floor receives the target product on the upper surface, supports the target product on the upper surface, and lowers the target product from the receiving position to the staging position while supporting the target product on the upper surface.

12. A system for enclosing a target product in a covering material, the system comprising:
   an elongate product chute having opposing ingress and egress end portions with an interior cavity extending therethrough;
   an elongate breech-loader chute having a primary chute body with opposing ingress and egress end portions, the breech-loader chute residing above and upstream of the product chute in cooperating alignment therewith, the primary chute body sloping downwardly in a direction of product travel;
   a receiving station disposed below the breech-loader chute and including a receiver floor that receives a target product from the breech-loader chute, wherein the receiver floor is selectively movable between an extended receiving position and a retracted staging position to thereby support and move the target product for delivery to the product chute;
   a floor drive mechanism operable to selectively move the receiver floor between the receiving position and the staging position; and
   a product pusher mechanism having a pusher head that is configured to controllably and automatically advance into and retract from the product chute to thereby advance a product through the product chute and out of the egress end portion of the product chute, wherein the product pusher mechanism has an automatic pusher cycle whereby the pusher head has a retracted configuration and an extended configuration, and wherein the floor drive mechanism is configured to operate in conjunction with the pusher cycle to automatically move the receiver floor into the receiving position when the pusher head is in the retracted configuration, and to maintain the receiver floor in the staging position when the pusher head is in the extended position.

13. The system of claim 12 further including an automated product stop mechanism associated with the primary body of the breech-loader chute to controllably and serially trap, then release target products at desired times, wherein, in operation, the product stop mechanism is configured to operate in conjunction with the pusher cycle:
   to release the target product from the breech-loader chute when the pusher head is in the retracted configuration and the receiver floor is in the receiving position; and
   to hold the target product in the egress end portion of the primary body of the breech-loader chute as the pusher head travels through the pusher cycle to its extended configuration and returns to the retracted configuration.

14. The system of claim 13 including:
   a product sensor disposed in the breech-loader chute configured to automatically detect when the target product is in position in the breech-loader chute;
   a pusher sensor configured to automatically detect when the pusher head is in the retracted configuration and/or the extended configuration; and
   a floor position sensor configured to automatically detect when the receiver floor is in the receiving position and/or the staging position.

15. The system of claim 13 wherein, when in the receiving position, the receiver floor is configured to receive the target product as the target product slidably exits from the primary chute body and, when in the staging position, the receiver floor is configured to hold the target product in axial and side-to-side alignment with the product chute upstream of the product chute so that the pusher mechanism can-push the target object into and through the product chute.

16. The system of claim 12 wherein the receiver floor has an upper surface and supports the target product from the breech-loader chute on the upper surface.

17. The system of claim 16 wherein the receiving floor receives the target product on the upper surface, supports the target product on the upper surface, and lowers the target product from the receiving position to the staging position while supporting the target product on the upper surface.

* * * * *